United States Patent
Tkaczuk et al.

(10) Patent No.: US 11,093,044 B2
(45) Date of Patent: Aug. 17, 2021

(54) METHOD FOR DETECTING INPUT USING AUDIO SIGNAL, AND ELECTRONIC DEVICE THEREFOR

(71) Applicant: Samsung Electronics Co., Ltd., Suwon-si (KR)

(72) Inventors: Jakub Tkaczuk, Rumia (PL); Roman Fraczek, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 16/492,046

(22) PCT Filed: Mar. 6, 2018

(86) PCT No.: PCT/KR2018/002645
§ 371 (c)(1),
(2) Date: Sep. 6, 2019

(87) PCT Pub. No.: WO2018/164451
PCT Pub. Date: Sep. 13, 2018

(65) Prior Publication Data
US 2020/0233499 A1 Jul. 23, 2020

(30) Foreign Application Priority Data
Mar. 6, 2017 (KR) .......... 10-2017-0028517

(51) Int. Cl.
*G06F 3/01* (2006.01)
*G06F 3/16* (2006.01)

(52) U.S. Cl.
CPC .......... *G06F 3/017* (2013.01); *G06F 3/167* (2013.01)

(58) Field of Classification Search
CPC .................. G06F 3/167; G06F 3/017
See application file for complete search history.

(56) References Cited

U.S. PATENT DOCUMENTS

| | | |
|---|---|---|
| 5,771,297 A | 6/1998 | Richardson |
| 6,246,761 B1 | 6/2001 | Cuddy |
| 7,142,666 B1 | 11/2006 | Bates et al. |

(Continued)

FOREIGN PATENT DOCUMENTS

| | | |
|---|---|---|
| JP | 2007-081460 A | 3/2007 |
| JP | 2009-077139 A | 4/2009 |

(Continued)

OTHER PUBLICATIONS

ISA/KR, International Search Report and Written Opinion of the International Searching Authority, International Application No. PCT/KR2018/002645, dated Jun. 7, 2018, 13 pages.

(Continued)

*Primary Examiner* — David L Ton

(57) ABSTRACT

Various embodiments of the present disclosure may provide an electronic device for detecting an input. The electronic device according to various embodiments of the present disclosure may comprise: a speaker; a microphone; and a processor coupled to the speaker and the microphone. The processor may be configured to output a sound through the speaker on the basis of a first audio signal; obtain a second audio signal from the sound through the microphone; detect an input on the basis of a result of comparison between the first audio signal and the inputted second audio signal; and perform an operation according to the input.

18 Claims, 31 Drawing Sheets

(56) References Cited

U.S. PATENT DOCUMENTS

| | | |
|---|---|---|
| 8,725,197 B2 | 5/2014 | Alameh et al. |
| 9,231,645 B2 | 1/2016 | Miwa |
| 2007/0036347 A1 | 2/2007 | Teicher |
| 2008/0165022 A1 | 7/2008 | Herz et al. |
| 2010/0048246 A1 | 2/2010 | Yin et al. |
| 2010/0315211 A1 | 12/2010 | Le-Faucheur |
| 2011/0040962 A1 | 2/2011 | Peyre |
| 2012/0231838 A1 | 9/2012 | Lyon et al. |
| 2013/0154919 A1 | 6/2013 | Tan et al. |
| 2013/0163768 A1 | 6/2013 | Salter et al. |
| 2014/0003611 A1 | 1/2014 | Mohammad et al. |
| 2014/0004909 A1 | 1/2014 | Jiang |
| 2014/0168135 A1 | 6/2014 | Saukko et al. |
| 2015/0160770 A1 | 6/2015 | Stewart et al. |

FOREIGN PATENT DOCUMENTS

| | | |
|---|---|---|
| KR | 10-2012-0094667 A | 8/2012 |
| KR | 10-2013-0048578 A | 5/2013 |
| KR | 10-2014-0107287 A | 9/2014 |
| KR | 10-2014-0122498 A | 10/2014 |

OTHER PUBLICATIONS

Communication pursuant to Article 94(3) EPC dated Nov. 27, 2020 in connection with European Application No. 18763432.4, 8 pages.
Supplementary European Search Report dated Feb. 24, 2020 in connection with European Patent Application No. 18 76 3432, 8 pages.

METHOD FOR DETECTING INPUT USING AUDIO SIGNAL, AND ELECTRONIC DEVICE THEREFOR

CROSS-REFERENCE TO RELATED APPLICATIONS

This application is a 371 National Stage of International Application No. PCT/KR2018/002645 filed on Mar. 6, 2018, which claims priority to Korean Patent Application No. 10-2017-0028517, filed Mar. 6, 2017, the disclosures of which are herein incorporated by reference in their entirety.

BACKGROUND

1. Field

The disclosure relates to input detection in an electronic device, and more particularly, to a method for detecting input using an audio signal and an electronic device thereof.

2. Description of Related Art

Various methods for interaction between a user and an electronic device such as a smartphone may be provided. For example, a user may interact with an electronic device through contact with an electronic device, for example, with a physical button and/or a touchable screen of the electronic device. In addition, a user may interact with an electronic device using an additional non-contact proximity sensor (e.g., an air gesture). The above-described interaction scheme requires a dedicated sensor for interaction.

SUMMARY

Therefore, the disclosure has been made in view of the above-mentioned problems, and an aspect of the disclosure is to provide a method for detecting user input by analyzing an audio signal without an additional sensor and an electronic device thereof.

Another aspect of the disclosure is to provide a method for detecting a hand covering gesture by a user using an audio signal and an electronic device thereof.

In accordance with an aspect of the disclosure, an electronic device for detecting input may include: a speaker, a microphone, and a processor configured to be coupled to the speaker and the microphone. The processor may be configured to output sound via the speaker based on a first audio signal, to acquire a second audio signal from the sound via the microphone, to detect an input based on a comparison result between the first audio signal and the second audio signal, and to perform an operation according to the input.

In accordance with another aspect of the disclosure, an operating method of an electronic device for detecting an input may include: outputting sound based on a first audio signal; acquiring a second audio signal from the sound; detecting an input based on a comparison result between the first audio signal and the input second audio signal, and performing an operation according to the input.

A method according to various embodiments of the disclosure and an electronic device thereof can detect user input by analyzing an audio signal, thereby detecting the user input without an additional sensor.

Effects which can be acquired by the disclosure are not limited to the above described effects, and other effects that have not been mentioned may be clearly understood by those skilled in the art from the following description.

DETAILED DESCRIPTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure relates to a method for detecting input using an audio signal and an electronic device thereof. In the following description, hand covering will be described as an example of input. "Hand covering" refers to a user's gesture in which at least a portion of an electronic device according to various embodiments of the disclosure is in contact with a user's hand or a user's hand approaches at least a portion of an electronic device. Although hand covering is described as an example of user input to an electronic device in the following description, other kinds of input that cause a change in an audio signal may be considered, and embodiments of the disclosure can provide a method and apparatus for detecting other kinds of input, as well as hand covering, based on an audio signal.

The term "sound", as used in the following description, may refer to a sound wave as a wave transmitted by vibration of a material using a material as a medium. In addition, the term "audio signal" may refer to an electrical signal for causing vibration for outputting sound or an electrical signal converted from a sound wave.

Figure 1:
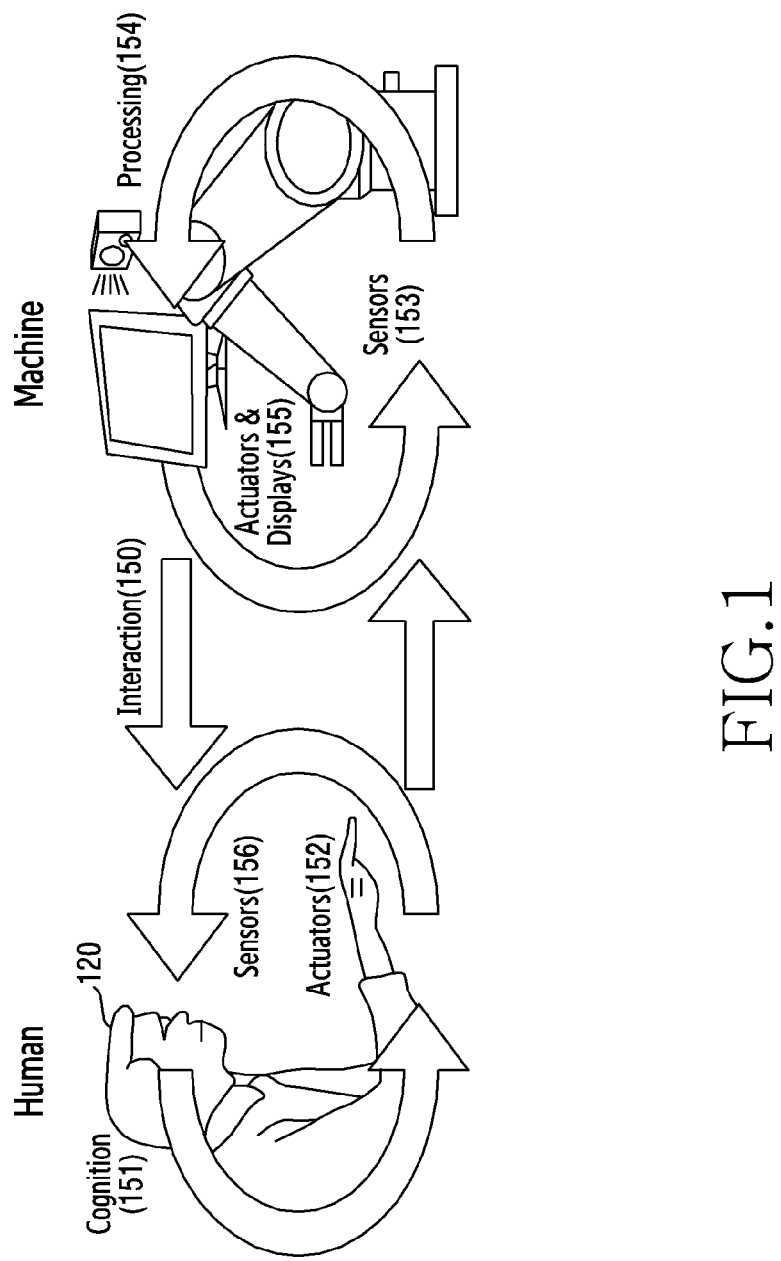
FIG. 1 illustrates an example of interaction between a person and an electronic device according to various embodiments of the disclosure.

FIG. 1 illustrates an example of interaction between a person and an electronic device according to various embodiments of the disclosure. FIG. 1 illustrates an example of interaction 150 between an electronic device 110 and a person 120.

Information output from the electronic device 110 may be transmitted to the person 120, and the person 120 may sense 153 and recognize 151 the information output from the electronic device 110. The person 120 applies input to the electronic device 110 as an actuator 152, and the electronic device 110 may sense 153 and process 154 the input. Next, the electronic device 110 may output information via an actuator or a display 155.

A user may interact with the electronic device 110 through contact with the electronic device 110, such as a physical button and/or a touchable screen of the electronic device 110. In addition, the user may interact with the electronic device 110 using an additional non-contact proximity sensor (e.g., an air gesture). According to various embodiments of the disclosure, the electronic device 110 may detect input (e.g., hand covering) applied to the electronic device 110 by analyzing an audio signal using a speaker and a microphone present in the electronic device, even without a separate sensor.

Figure 2:
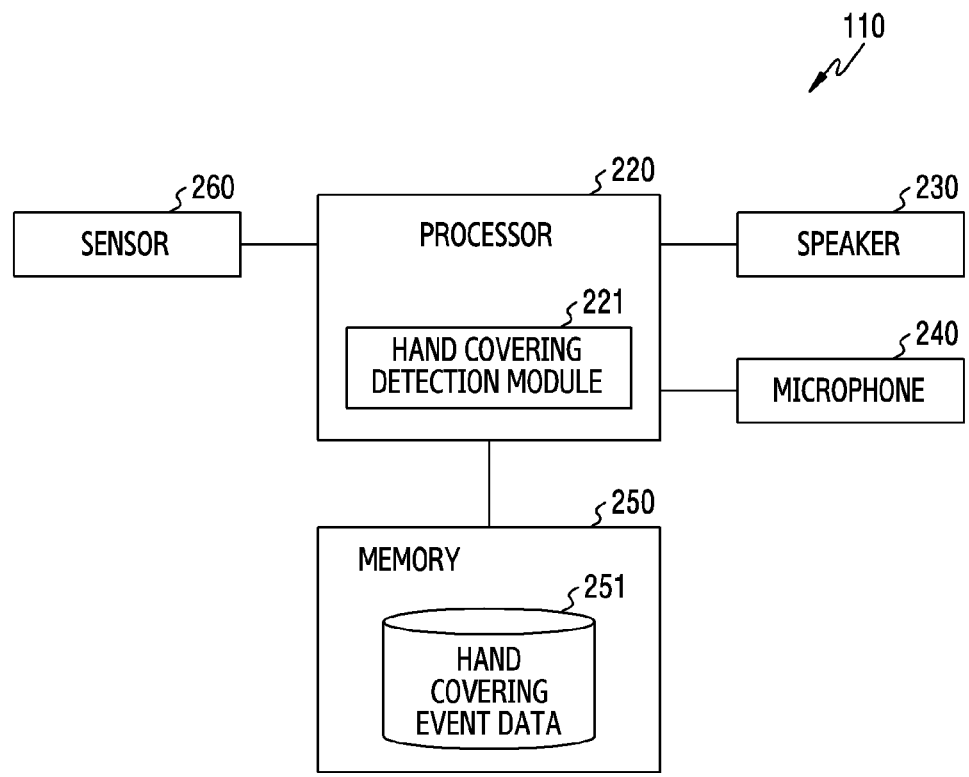
FIG. 2 illustrates an example of the functional configuration of an electronic device according to various embodiments of the disclosure.

FIG. 2 illustrates an example of the functional configuration of an electronic device according to various embodiments of the disclosure. The electronic device of FIG. 2 may be an example of the electronic device 110 of FIG. 1. The electronic device 110 of FIG. 2 may include a processor 220, a speaker 230, a microphone 240, a memory 250, and a sensor 260.

The processor 220 may process data and control other configurations to perform the functions of the electronic device 110. For example, in order to control the operation of the electronic device 110, the processor 220 may execute one or more instructions stored in the memory 250. The processor 220 may be constituted of one or more processors or microprocessors. The processor 220 may drive, for example, an operating system or an application to control a plurality of hardware or software components connected to the processor 220, and may perform various data processing and operations. The processor 220 may be implemented as, for example, a system on chip (SoC). According to one embodiment, the processor 220 may further include a graphic processing unit (GPU) and/or an image signal processor. The processor 220 may include at least some of the components shown in FIG. 2. The processor 220 may load and process instructions or data received from at least one of the other components (e.g., the memory 250) into the memory 250, and may store the resultant data in the memory 250. According to various embodiments of the disclosure, the processor 220 may include a hand-covering detection module 221.

The hand-covering detection module 221 may perform a function for detecting whether hand covering occurs with respect to at least a partial region of the electronic device 110, For example, the hand-covering detection module 221 may output sound via the speaker 230 and may detect hand covering based on an audio signal input via the microphone 240. According to various embodiments of the disclosure, the hand-covering detection module 221 may be storage in which instructions or code are stored at least temporarily in the processor 220 as a set of instructions stored in the memory 250 or code, or may be a portion of a circuit constituting the processor 220. An operation for detecting hand covering based on an audio signal described below can be performed by the processor 220 or the hand-covering detection module 221.

The speaker 230 may perform a function for outputting sound. For example, the speaker 230 may output sound by vibrating a diaphragm included in the speaker 230 based on audio data provided from the processor 220. According to various embodiments of the disclosure, the speaker 230 may be constituted of a plurality of speakers located in different regions of the electronic device 110.

The microphone 240 may perform a function for inputting an audio signal. For example, the microphone 240 may generate an audio signal based on the sound input via the microphone, and may provide the generated audio signal to the processor 220. According to various embodiments of the disclosure, the microphone 240 may be constituted of a plurality of microphones located in different regions of the electronic device 110.

The memory 250 may perform a function for storing data of the electronic device 110 or instructions for the operation of the processor 220. The memory 250 may include, for example, internal memory or external memory. The internal memory may include at least one of volatile memory (e.g., DRAM, SRAM, or SDRAM) and non-volatile memory (e.g., one-time programmable ROM (OTPROM), PROM, EPROM, EEPROM, mask ROM, flash ROM, flash memory, a hard drive, or a solid-state drive (SSD)). The externa may include a flash drive, for example, a compact flash (CO, a secure digital (SD), a micro-SD, a mini-SD, an extreme digital (xD), a multimedia card, or a memory stick. The external memory may be functionally or physically connected to the electronic device 110 via various interfaces. According to various embodiments of the disclosure, the memory 250 may store hand-covering event data 251.

The hand-covering event data 251 may include reference data for detecting hand covering. For example, the hand-covering event data 251 may include data of an audio signal input when hand covering occurs with respect to a specific audio signal. Also, according to various embodiments of the disclosure, the hand-covering event data 251 may include data on the characteristics of the audio signal for each ambient environment in which the electronic device 110 may be located. For example, the hand-covering event data 251 may include data on the characteristics of the audio signal with respect to an environment in which the electronic device 110 is on a desk, an environment in which the electronic device 110 is in a bag, or an environment in which the electronic device 110 is in a pocket. In addition, for example, the hand-covering event data 251 may include data on the characteristics of the audio signal with respect to an environment in which a user is not moving while the electronic device is in a bag or in an environment in which a user is walking while the electronic device is in a bag.

The sensor 260 may, for example, measure a physical quantity or sense the operating state of the electronic device 110, and may convert the measured or sensed information into an electrical signal. The sensor 260 may include at least one of, for example, a gesture sensor, a gyro sensor, an atmospheric pressure sensor, a magnetic sensor, an acceleration sensor, a grip sensor, a proximity sensor, a color sensor (e.g., an RUB (red, green, blue) sensor), a biometric sensor, a temperature/humidity sensor, an illumination sensor, or an ultraviolet (UV) sensor. Additionally or alternatively, the sensor 260 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor 260 may further include a control circuit for controlling at least one or more sensors belonging thereto. According to various embodiments of the disclosure, the sensor 260 may be utilized to detect hand covering based on an audio signal. Unlike the example of FIG. 2, the sensor 260 may be omitted depending on the function of the electronic device 110.

Although not shown in FIG. 2, various configurations may be included in the electronic device 110 depending on the functions of the electronic device 110. For example, the electronic device 110 may further include a communication unit for performing communication with other electronic devices. According to various embodiments of the disclosure, the electronic device 110 may detect hand covering in conjunction with other devices using a communication unit. Further, the electronic device 110 may further include a display for outputting a result according to a control operation.

Figure 3A:
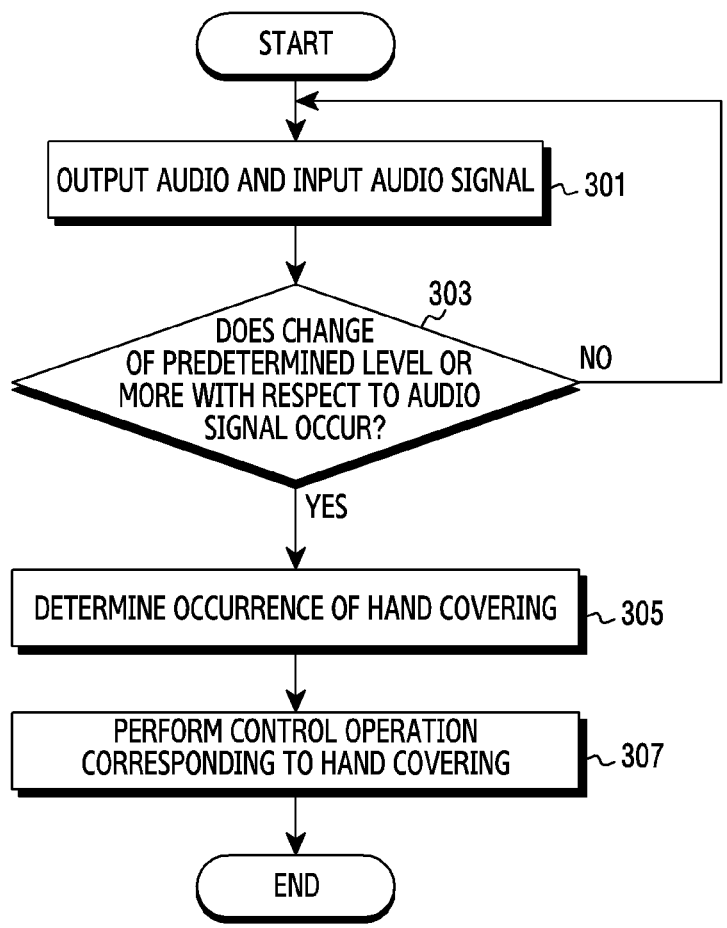
FIG. 3A illustrates a method for detecting input by an electronic device according to various embodiments of the disclosure.

FIG. 3A illustrates a method for detecting input by an electronic device according to various embodiments of the disclosure. FIG. 3A illustrates a method of operation of the electronic device 110.

Referring to FIG. 3A, in operation 301, the electronic device 110 may output the sound of an audio signal via the speaker 230, and may receive the audio signal via the microphone 240. More specifically, the electronic device 110 may output the sound of the audio signal configured to detect hand covering via the speaker 230. For example, the audio signal output via the speaker 230 may be a ring tone for providing notification of a call received by the electronic device 110 or an alarm for providing notification of a scheduled event. In addition, the sound of the audio signal output via the speaker 230 may include an audio signal of a predefined pattern that is output at regular intervals, According to various embodiments of the disclosure, the output sound of the audio signal may be output via the speaker 230 when certain conditions are satisfied (e.g., when the electronic device 110 moves). The audio signal Obtained via the microphone 240 may include an audio signal output by another electronic device.

According to various embodiments of the disclosure, the speaker 230 may include a plurality of speaker elements, each located at a different portion of the electronic device 110, and the microphone 240 may include a plurality of microphone elements, each located at a different portion of the electronic device 110. The electronic device 110 may output the sound of the audio signal using at least one of the plurality of speaker elements, and may also acquire the audio signal using at least one of the plurality of microphone elements.

In operation 303, the electronic device 110 may determine whether a change of a predetermined level or more with respect to the audio signal occurs. For example, when a change of a predetermined level or more with respect to an audio signal input via the microphone 240 occurs, the electronic device 110 may proceed to operation 305, and may determine the occurrence of the change of the predetermined level or more to be detection of hand covering. According to various embodiments of the disclosure, the change in the audio signal may include at least one of a change in the waveform of the audio signal, a magnitude change thereof, an energy change thereof, or a change in the signal strength per frequency band thereof. If the audio signal input via the microphone 240 is maintained within a predetermined level, the electronic device 110 may return to operation 301 and may perform audio signal output and input.

In operation 305, the electronic device 110 may determine whether hand covering is detected. More specifically, the electronic device 110 may determine that hand covering occurs when the change in the input audio signal is equal to or greater than the predetermined level. That is, the electronic device 110 may detect the hand covering by confirming the change in the audio signal obtained via the microphone 240. At this point, according to various embodiments of the disclosure, although not shown in FIG. 3A, the electronic device 110 may transmit a signal for notifying other electronic devices of the detection of the hand covering.

In operation 307, the electronic device 110 may perform a control operation corresponding to the hand. For example, when hand covering is detected while a ring tone is being output, the electronic device 110 may terminate the ring tone. When hand covering is detected while an alarm of a predetermined event being output, the electronic device 110 may terminate the alarm. Also, according to various embodiments of the disclosure, when hand covering is detected during a call, the electronic device 110 may initiate recording of the call. Alternatively, when hand covering is detected during recording of a call, the electronic device 110 may terminate the recording of the call. According to various embodiments of the disclosure, the electronic device 110 may determine the control operation based on the number of times the hand covering is detected. For example, the electronic device 110 may reduce the volume of the ring tone in response to first hand covering while a call is received and a ring tone is output, may stop the output of the ring tone in response to second hand covering, and may reject the incoming call in response to third hand covering.

Figure 3B:
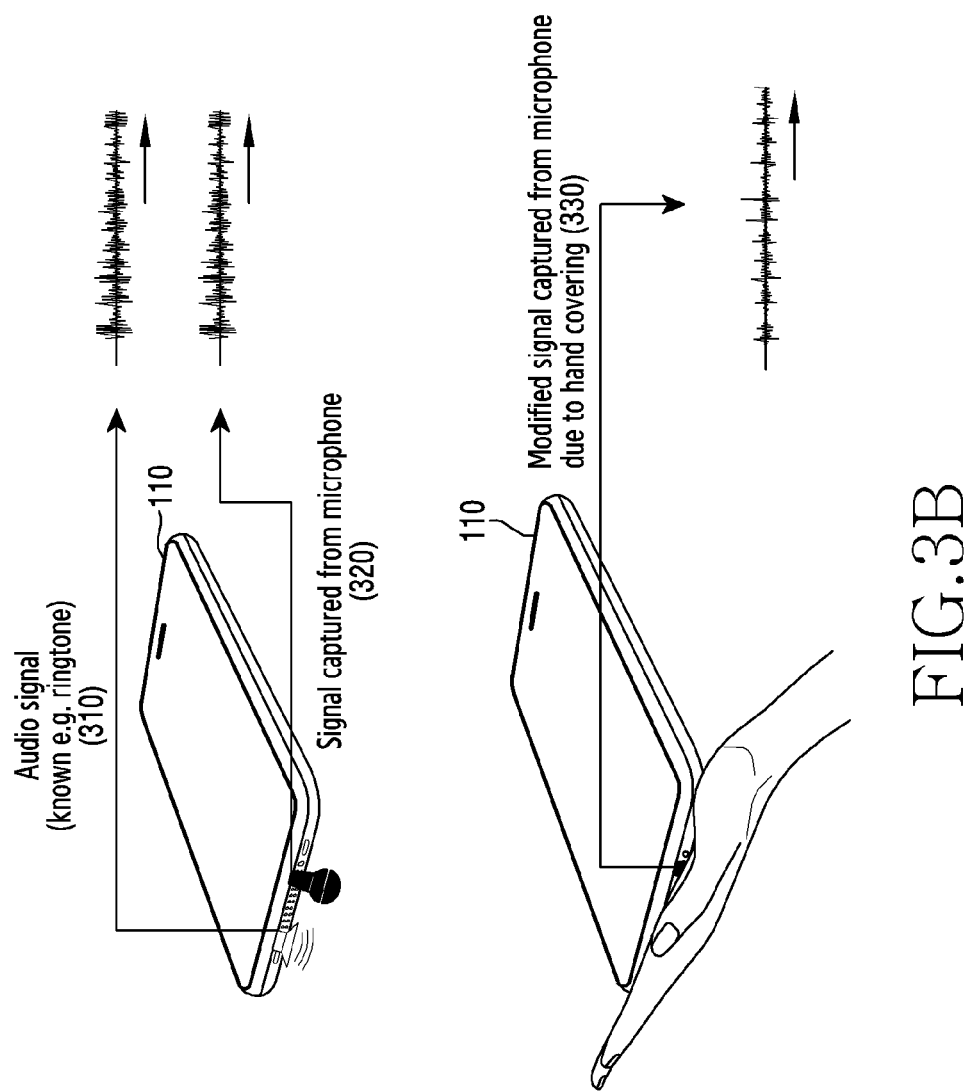
FIG. 3B illustrates an example of an audio signal for detecting hand covering in an electronic device according to various embodiments of the disclosure.

FIG. 3B illustrates an example of an audio signal for detecting hand covering in an electronic device according to various embodiments of the disclosure. Referring to FIG. 3B, the electronic device 110 may output a sound (e.g., a ring tone) 310 of an audio signal via the speaker 230. In addition, the electronic device 110 may acquire an audio signal 320 via the microphone 240. In a general environment in which there is no object around the speaker, the audio signal 320 input via the microphone 240 may be substantially the same as the audio signal 310 output via the speaker 230, or may be an audio signal having distortion within a predetermined level compared to the audio signal 310.

When hand covering occurs around the speaker 230 of the electronic device 110, the audio signal 330 inputted via the microphone 240 may have distortion greater than predetermined level or greater than the audio signal 310 output via the speaker 230. The electronic device 110 may detect the occurrence of hand covering by confirming that the audio signal 330 having the distortion greater than the predetermined level or greater than the audio signal 310 output via the speaker 230 is input. In response to the detection of the hand covering, the electronic device 110 may perform a control operation corresponding to the hand covering.

Figure 3C:
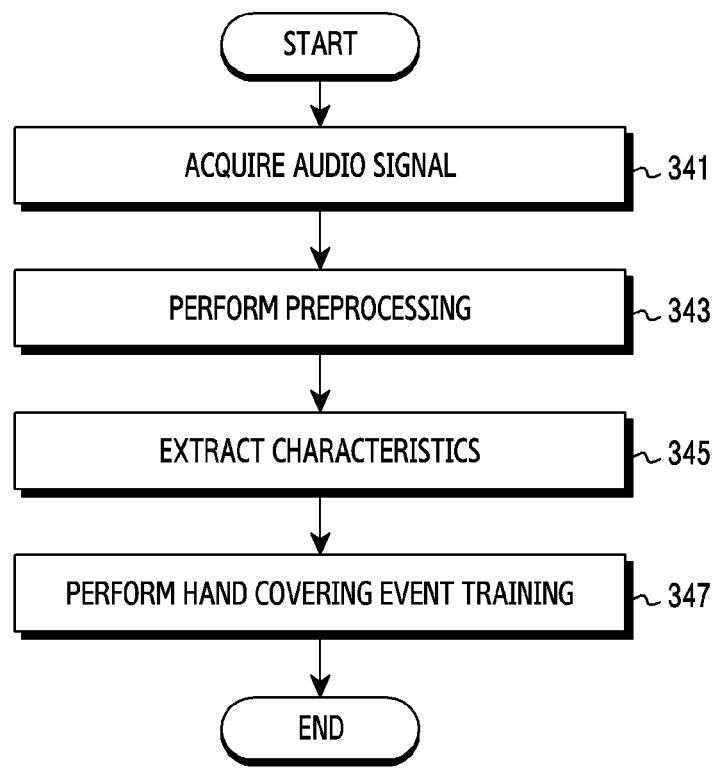
FIG. 3C illustrates a method of training for machine learning of an electronic device according to various embodiments of the disclosure.

As in the embodiment described with reference to FIG. 3A, the electronic device 110 may detect hand covering based on an audio signal. To this end, the electronic device 110 analyzes the audio signal and measures a change in the audio signal according to the analysis result. At this point, according to various embodiments, the electronic device 110 may analyze the audio signal using a machine-learning algorithm. In addition, for analysis of the audio signal using the machine-learning algorithm, the electronic device 110 may analyze the audio signal in conjunction with a server. Referring to FIG. 3C, an embodiment related to machine learning is described.

FIG. 3C illustrates a method of training for machine learning of an electronic device according to various embodiments of the disclosure. FIG. 3C illustrates a method of operation of the electronic device 110.

Referring to FIG. 3C, in operation 341, the electronic device 110 may acquire an audio signal. For example, the electronic device 110 may acquire an audio signal input via the microphone 240.

In operation 343, the electronic device 110 may perform preprocessing on the acquired audio signal. For example, the electronic device 110 may extract a component corresponding to the audio signal output by the speaker 230 from the acquired audio signal. In addition, the electronic device 110 may remove noise components from the acquired audio signal.

In operation 345, the electronic device 110 may extract feature points from the acquired audio signal. The feature points extracted from the audio signal may include a waveform of the audio signal and a frequency distribution thereof. According to various embodiments of the disclosure, the electronic device 110 may extract feature points of an audio signal obtained when hand covering occurs. In addition, the electronic device 110 may extract feature points according to the environment of the electronic device 110. For example, the electronic device 110 may extract feature points for each of an environment in which the electronic device 110 is in a pocket and an environment in which the electronic device 110 is in a bag. Information about the extracted feature points may be stored in the memory 250 of the electronic device 110. For example, the electronic device 110 may store information about feature points extracted as hand-covering event data 251 in the memory 250.

In operation 347, the electronic device 110 may perform training. For example, the electronic device 110 may perform training for detection of hand covering using information on the extracted feature points. In other words, the electronic device 110 may compare the feature points of the audio signal with other audio signals when hand covering occurs, and may generate information on the feature point of the audio signal obtained when the hand covering occurs, as a training model. The training model generated according to the information training result may be stored as hand-covering event data 251 in the memory 250 of the electronic device 110. In addition, the electronic device 110 may transmit information on the training model to an entity (e.g., a server) of a network that is connected to the electronic device 110. The entity of the network receiving the information on the training model may store the corresponding training model. In addition, the entity of the network receiving the information on the training model may update a machine-learning database using the received training model.

Figure 3D:
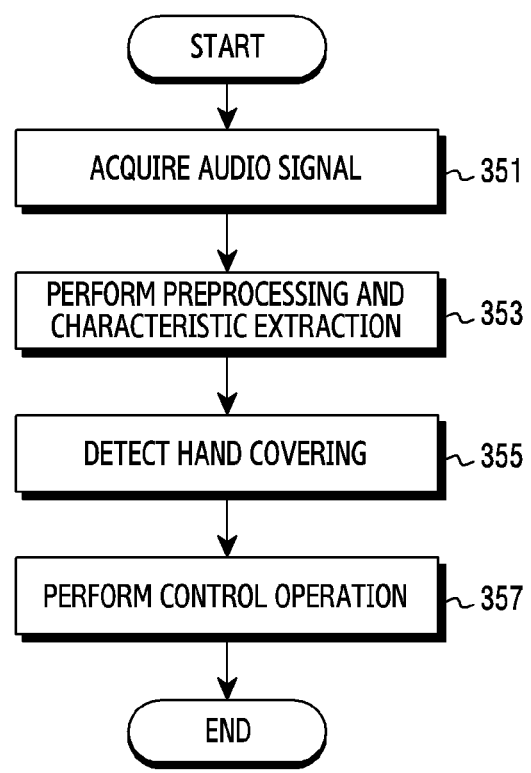
FIG. 3D illustrates a method for detecting hand covering using machine learning in an electronic device according to various embodiments of the disclosure.

FIG. 3D illustrates a method for detecting hand covering using machine learning in an electronic device according to various embodiments of the disclosure. FIG. 3D illustrates a method of operation method of the electronic device 110.

In operation 351, the electronic device 110 may acquire an audio signal. For example, the electronic device 110 may acquire an audio signal input via the microphone 240.

In operation 353, the electronic device 110 may perform preprocessing and characteristic extraction. For example, the electronic device 110 may extract a component corresponding to the audio signal output by the speaker 230 from the acquired audio signal. In addition, the electronic device 110 may remove noise components from the acquired audio signal. The feature points extracted from the audio signal may include a waveform of the audio signal and a frequency distribution thereof.

In operation 355, the electronic device 110 may detect hand covering. According to various embodiments of the disclosure, the electronic device 110 may detect hand covering from the audio signal obtained using the training model stored in the electronic device 110. In addition, the electronic device 110 may obtain information (e.g., a training model) for detecting hand covering by accessing a database of a network connected to the electronic device 110.

In operation 357, the electronic device 110 may perform a control operation. For example, the electronic device 110 may perform a control operation corresponding to hand-covering detection.

According to various embodiments of the disclosure, the electronic device 110 may perform machine learning for hand-covering detection in conjunction with the network to which the electronic device 110 is connected. A network according to various embodiments of the disclosure may manage the training model and data for hand-covering detection in conjunction with a plurality of electronic devices. The network may be constituted of one or more network entities.

Figure 3E:
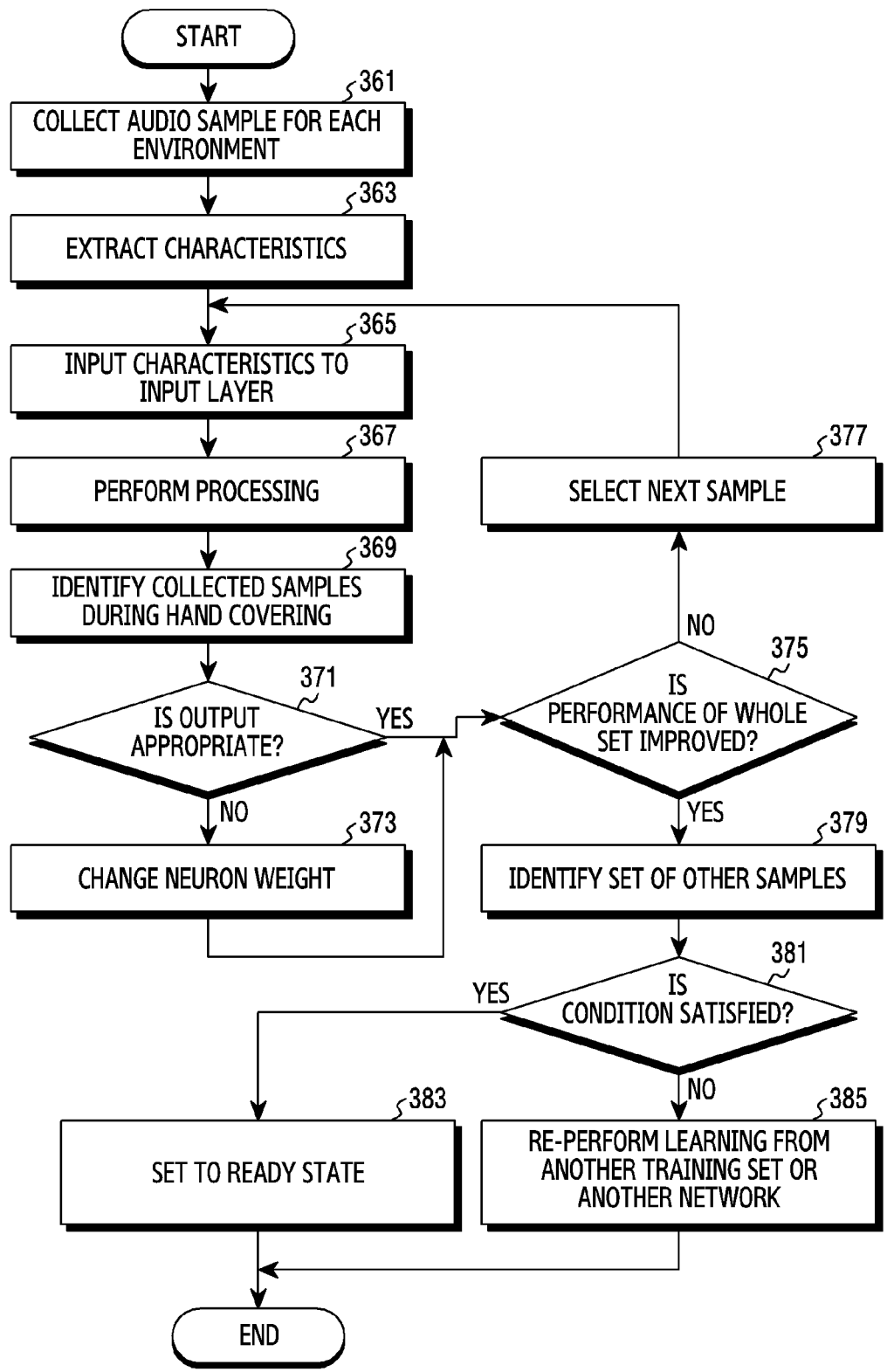
FIG. 3E illustrates a method for determining a machine-learning database in a network according to various embodiments of the disclosure.

FIG. 3E illustrates a method for determining a machine-learning database in a network according to various embodiments of the disclosure. FIG. 3E illustrates a method of operation method of the network. For example, the entity constituting the network may be a database or a server. The network according to various embodiments of the disclosure may be connected to a plurality of network entities to perform interaction. The network to which the plurality of network entities are connected may be referred to as a neural network, and each network entity included in the neural network may be referred to as a neuron.

In operation 361, the network may collect an audio sample for each environment. For example, the network may receive data for the samples of the audio signal obtained by electronic devices connected to the network. In addition, the samples of the audio signal may be collected in various environments, and data on the samples of the audio signal received by the network may include information on the environment at which the audio signal is obtained.

In operation 363, the network may extract the characteristics of each audio sample. The feature point extracted from the audio signal may include a waveform of the audio signal and a frequency distribution thereof.

In operation 365, the network may input the characteristics into an input layer. More specifically, the network may transmit the extracted characteristics of the collected audio signal to the network entity or the neuron corresponding to the input layer. The input layer may include a set of the neurons configured to receive the samples of the audio signal.

In operation 367, the network may perform processing on the input characteristics. For example, the network may identify whether the corresponding audio signal is an audio signal generated during hand covering or an audio signal generated in the absence of hand covering by processing the input characteristics. Further, the network may process the characteristics according to the environment in which the audio signal samples are collected. Processing of the characteristics may be performed by a neuron corresponding to a hidden layer in the network.

In operation 369, the network may identify the samples collected during hand covering. For example, the network may identify the samples of the audio signal collected in an environment in which hand covering occurs. The network may use the collected information on the environment together with the collected samples of the audio signal to determine whether the corresponding samples are samples of the audio signal that were collected during hand covering. The network may output data on the samples of the audio signal collected during hand covering as the training model.

In operation 371, the network may determine whether the output data is appropriate. More specifically, the network may determine whether data output by the processing for the characteristics is suitably processed data. For example, the network may determine whether the output data has been processed to meet a predetermined criterion. When it is determined that the output is appropriate, the network may proceed to operation 375.

When it is determined that the output is not appropriate, the network entity may proceed to operation 373. In operation 373, the network may change a neuron weight. The neuron weight may include a data-processing parameter for each of the neurons included in the hidden layer. After the neuron weight is changed, the network may proceed to operation 375.

In operation 375, the network may determine whether the performance of the entire set is improved. The network may inspect the performance of a set of the samples of the audio signal when hand covering occurs. Whether the performance of the set is improved may include the detection time or the detection accuracy.

When it is determined that the performance of the entire set is not improved, the network may proceed to operation 377. In operation 377, the network may select the next sample and proceed to operation 365.

In operation 379, the network may identify a set of other samples. For example, the network may identify a set of samples which is different from a set including the samples of the audio signal of the output data.

In operation 381, the network may identify whether the corresponding condition is satisfied. For example, the network may inspect whether the different samples of the audio signal and the samples of the audio signal of the output data overlap each other or conflict with each other.

If the condition is satisfied, the network may proceed to operation 383. In operation 383, the network may be set to a ready state. For example, the network 383 may update the database by adding the processed samples of the audio signal and the related data.

If the condition is not satisfied, the network may proceed to operation 385. In operation 385, the network may re-perform learning from another training set or another network. In this case, the procedure of FIG. 3E may be performed again in the other training set or in the other network.

Figure 4A:
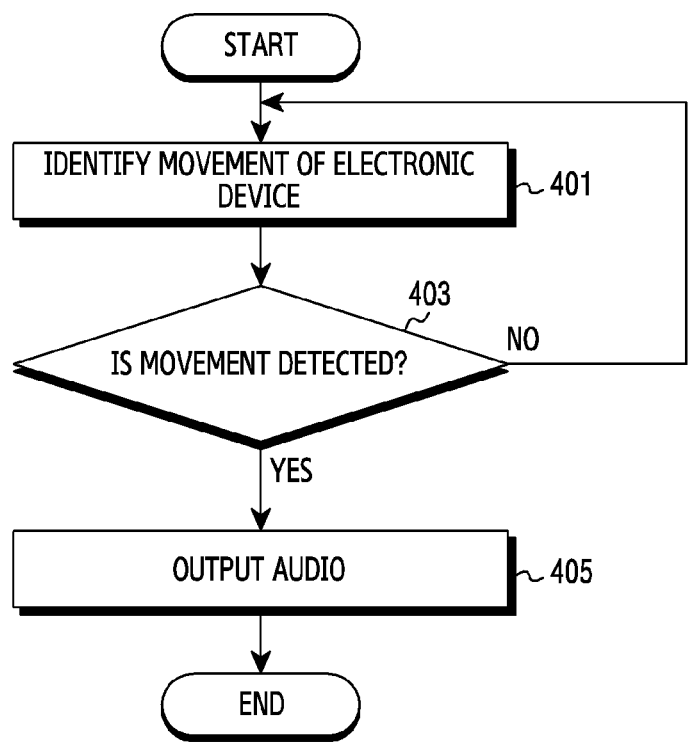
FIG. 4A illustrates a method for outputting sound of an audio signal in an electronic device according to various embodiments of the disclosure.

FIG. 4A illustrates a method for outputting sound of an audio signal in an electronic device according to various embodiments of the disclosure. FIG. 4A illustrates an example in which the movement of the electronic device 110 occurs as a condition for the electronic device 110 to output the sound of the audio signal for hand-covering detection. The flowchart of FIG. 4A shows an example of operation 301 of FIG. 3.

Referring to FIG. 4A, in operation 401, the electronic device 110 may determine whether the movement of the electronic device 110 occurs. More specifically, the electronic device 110 may use the sensor 260 to determine whether movement of the electronic device 110 occurs and information about the movement of the electronic device 110. According to various embodiments of the disclosure, the sensor 260 may include a gyro sensor, a grip sensor, or an acceleration sensor. The information about the movement of the electronic device 110 may include a movement direction of the electronic device 110, a movement speed of the electronic device 110, a rotational direction of the electronic device 110, or a rotational speed of the electronic device 110.

Figure 4B:
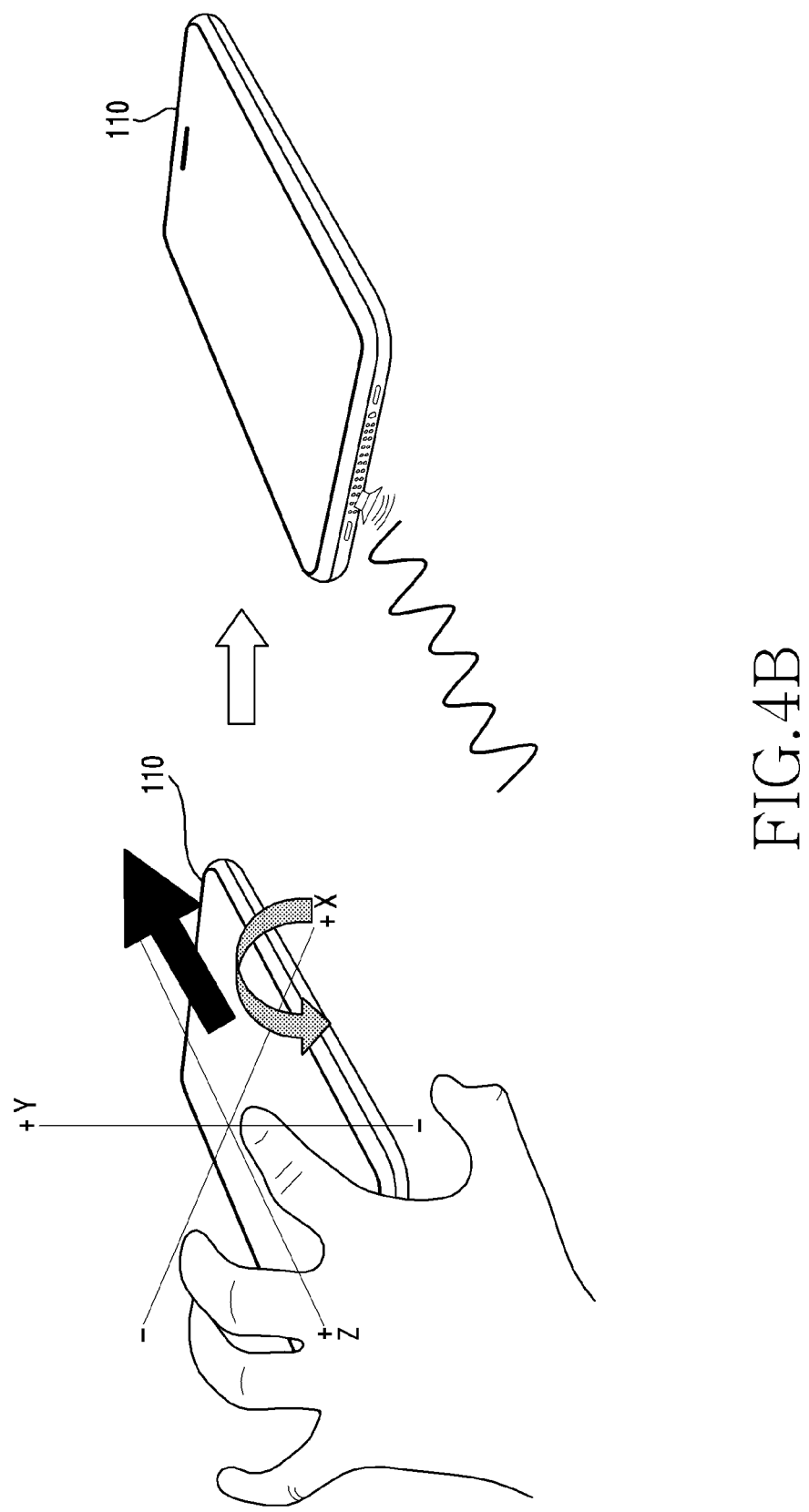
FIG. 4B illustrates an example of a procedure for detecting the movement of an electronic device in the electronic device according to various embodiments of the disclosure.

In operation 403, the electronic device 110 may determine whether movement of the electronic device 110 occurs. According to various embodiments of the disclosure, the electronic device 110 may determine that movement of the electronic device 110 occurs when the electronic device 110 moves at a predetermined acceleration or more, or when rotation occurs at a predetermined rotational acceleration or more. For example, as shown in FIG. 4B, the electronic device 110 may detect the rotation of the electronic device 110 with respect to the x, y, and z axes using the sensor 260 including the gyro sensor. If no movement of the electronic device 110 is detected, the electronic device 110 may return to operation 401 to monitor the movement of the electronic device 110. If the movement of the electronic device 110 is detected, the electronic device 110 may proceed to operation 405.

In operation 405, the electronic device 110 may output the sound of the audio signal via the speaker 230. In other words, the electronic device 110 may output a signal for detecting hand covering in response to detection of the movement of the electronic device 110. For example, as shown in FIG. 4B, when a predetermined amount of rotation or more is detected by the sensor 260, the electronic device 110 may output the sound of the audio signal for detecting hand covering via the speaker 230. Generally, the situation in which the movement of the electronic device 110 occurs may be a situation in which a user operates the electronic device 110. Therefore, it is highly likely that hand covering is detected when the movement of the electronic device 110 occurs. The sound of the audio signal for detecting hand covering is output via the speaker 230 in response to the occurrence of the movement of the electronic device 110, so that power consumption can be reduced while enhancing the ability to detect hand covering.

According to various embodiments of the disclosure, the electronic device 110 may identify information about the ambient environment of the electronic device 110, and may determine a level for interpreting the audio signal based on the information about the ambient environment. Also, according to various embodiments of the disclosure, the electronic device 110 may identify the information about the ambient environment by comparing information about the characteristics of the audio signal for each ambient environment stored in the memory 250 with the audio signal obtained via the microphone 240. Hereinafter, referring to FIG. 5A, an embodiment for detecting hand covering in consideration of the ambient environment will be described.

Figure 5A:
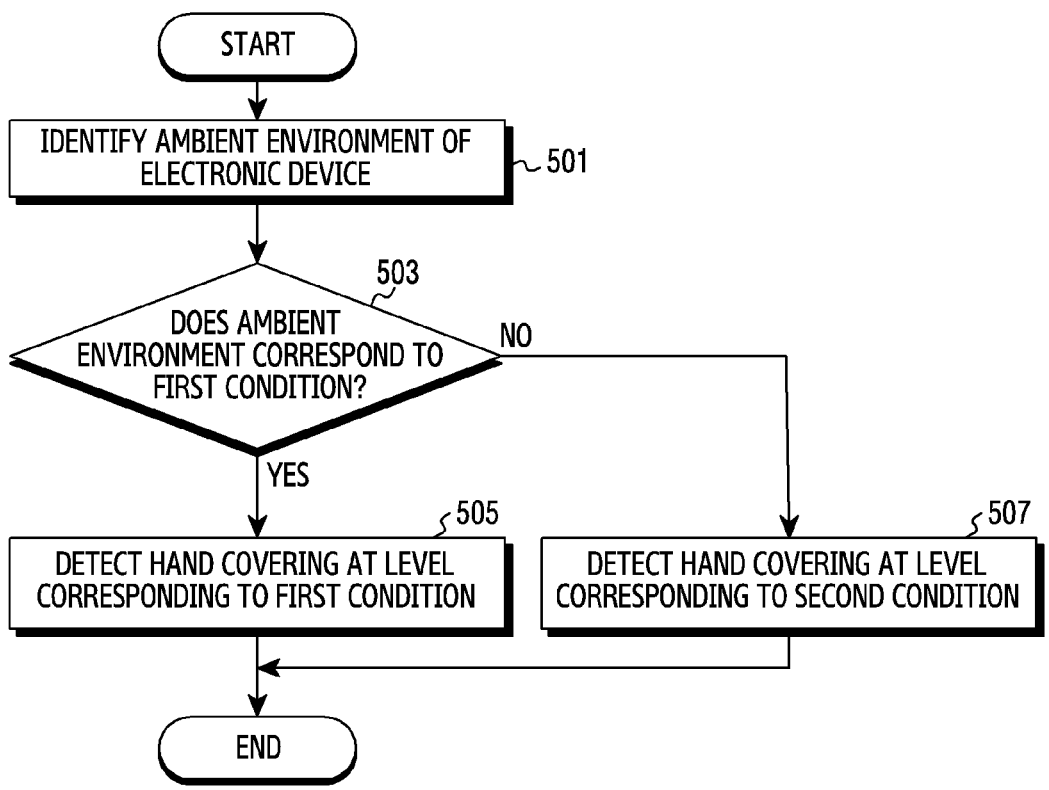
FIG. 5A illustrates a method for detecting hand covering based on an ambient environment in an electronic device according to various embodiments of the disclosure.
Figure 5B:
FIGS. 5B and 5C illustrate examples of procedures for detecting hand covering in an environment in which an electronic device according to various embodiments of the disclosure is located in a bag.

FIG. 5A illustrates a method for detecting hand covering based on an ambient environment in an electronic device according to various embodiments of the disclosure. FIG. 5B illustrates an example of interpreting an audio signal for detecting hand covering in consideration of the ambient environment of the electronic device 110. The flowchart of FIG. 5B may illustrate an example of operation 303 of FIG. 3A.

Referring to FIG. 5A, in operation 501, the electronic device 110 may identify the ambient environment of the electronic device 110. For example, the electronic device 110 may determine whether the electronic device 110 is on a table, in a bag, or in a pants pocket. Also, for example, the electronic device 110 may determine whether the user of the electronic device 110 is stationary or walking. According to various embodiments of the disclosure, the electronic device 110 may use the microphone 240 or the sensor 260 to identify information about an environment around the electronic device 110. For example, the electronic device 110 may identify the ambient environment of the electronic device 110 by analyzing the audio signal input via the microphone 240, Further, the electronic device 110 may identify the ambient environment of the electronic device 110 through an illuminance sensor included in a camera or the sensor 260. For example, if it is determined that the ambient environment is dark through the camera or sensor 260 during daylight hours, the electronic device 110 may determine that the electronic device 110 is in a bag.

In operation 503, the electronic device 110 may determine whether the ambient environment of the electronic device 110 corresponds to a first condition. According to various embodiments of the disclosure, the first condition may be a condition in which the sound of the audio signal output via the speaker 230 and the audio signal input via the microphone have a difference within a predetermined level. In other words, the first condition may be a condition in which a signal substantially the same as the sound of the audio signal output via the speaker 230 is input via the microphone 240. The first condition may be a condition corresponding to an environment in which the electronic device 110 is placed on a table. The electronic device 110 may determine a level associated with interpretation of the audio signal to detect hand covering based on whether the ambient environment of the electronic device 110 corresponds to the first condition.

When the ambient environment of the electronic device 110 meets the first condition, the electronic device 110 may proceed to operation 505. In operation 505, the electronic device 110 may detect hand covering at a level corresponding to the first condition. For example, in accordance with the first condition that the audio signal input via the microphone 240, which is substantially the same as the sound of the audio signal output via the speaker 230, is input, the electronic device 110 may detect hand covering at a relatively large change level of the signal as the level corresponding to the first condition. In other words, the electronic device 110 may determine that hand covering is detected when a relatively large change in the audio signal occurs under general conditions, in which signal distortion hardly occurs. According to various embodiments of the disclosure, the level for detecting hand covering may be a level associated with a change in the waveform of the audio signal or a change in the signal strength per frequency band.

When the ambient environment of the electronic device 110 does not meet the first condition, the electronic device 110 may proceed to operation 507, In operation 507, the electronic device 110 may detect hand covering at a level corresponding to a second condition. For example, when the audio signal input via the microphone 240 is a distorted signal of the sound of the audio signal output via the speaker 230, the electronic device 110 may detect hand covering at a relatively small change level of the signal as a level corresponding to the second condition. In other words, the electronic device 110 may determine that hand covering is detected even if a relatively small change in the audio signal occurs under the condition that distortion of the signal occurs.

According to various embodiments of the disclosure, when the ambient environment of the electronic device 110 meets the second condition, the electronic device 110 may detect hand covering based on the amount of change in the audio signal input to the microphone 240 over time. For example, if the electronic device 110 is in a bag, it may be determined that hand covering occurs when the audio signal input to the microphone 240 is received in a distorted state to some extent and a change in the distortion state of the audio signal input to the microphone 240 occurs.

Although FIG. 5A shows a flowchart for detecting hand covering according to two conditions, three or more conditions may be set according to the ambient environment of the electronic device 110, and a level for detecting hand covering may be set for each condition. In addition, according to various embodiments of the disclosure, analysis data for detecting hand covering according to the conditions of each ambient environment of the electronic device 110 may be stored in the memory 250. For example, hand-covering event data 251 stored in the memory 250 may include characteristics of the audio signal according to the ambient environment of the electronic device 110 and information about the audio signal when hand covering occurs.

Figure 5C:
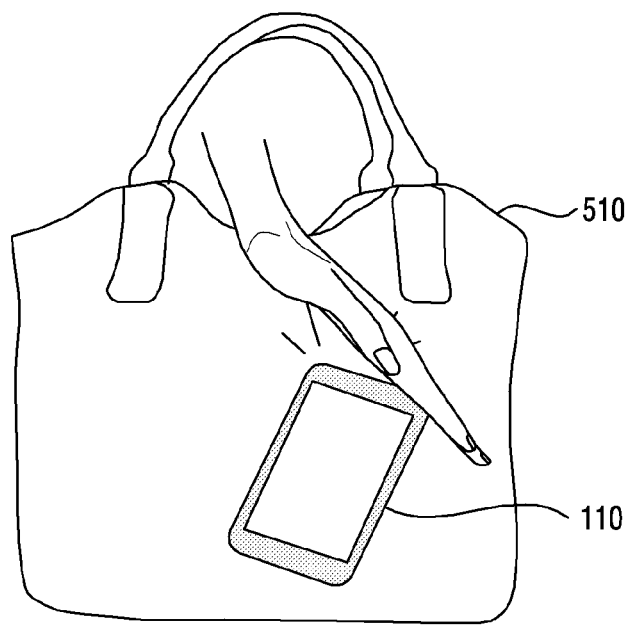

FIGS. 5B and 5C illustrate examples of procedures for detecting hand covering in an environment in which an electronic device according to various embodiments of the disclosure is located in a bag. Referring to FIG. 5A, the electronic device 110 may confirm that the electronic device 110 is located in a bag 510 using the microphone 240 or the sensor 260. As shown in FIG. 5B, when the sound of the audio signal is output via the speaker 230 in the bag 510, the audio signal input to the microphone 240 may be distorted to some degree. The electronic device 110 may detect hand covering in consideration of the distortion caused by the presence of the electronic device 110 in the bag 510.

Referring to FIG. 5C, a hand covers at least a portion of the electronic device 110. In comparing the audio signal output via the speaker 230 with the audio signal input via the microphone 240, the electronic device 110 may detect hand covering in consideration of the state in which the electronic device 110 is in a berg 510. According to various embodiments of the disclosure, hand-covering event data 251 stored in the memory 250 of the electronic device 110 may be used to detect hand covering. For example, the electronic device 110 may detect hand covering based on the characteristics of the audio signal in the state in which the electronic device 110 251 is located within the bag 510, which is included in the hand-covering event.

Further, according to various embodiments of the disclosure, the electronic device 110 may detect hand covering based on a change in the input audio signal over time. For example, the electronic device 110 may determine that hand covering is detected when a change in the input audio signal occurs compared to a first audio signal input in the environment in which the electronic device 110 is located in the bag 510. In other words, the electronic device 110 may determine that hand covering is detected when an audio signal, distorted to some extent by the bag 510, is received via the microphone 240 and a change in the audio signal occurs at a specific time point. According to various embodiments of the disclosure, the change in the audio signal may include a change in the waveform of the audio signal or a change in the signal strength for each frequency band.

In addition, according to various embodiments of the disclosure, the electronic device 110 may detect hand covering in consideration of the Mate in which the electronic device 110 is located within a bag 510. For example, the electronic device 110 may confirm that the audio signal input via the microphone 240 is distorted to some extent due to the bag 510 compared to the sound of the audio signal output via the speaker 230. It can be confirmed that additional distortion occurs in the audio signal input via the microphone 240 while the distorted audio signal is input via the microphone 240. Here, even if the additional distortion of the input audio signal is less than a predetermined level, the electronic device 110 may detect this to be hand covering in consideration of the presence of the electronic device 110 in the bag 510. In other words, if the state in which the electronic device 110 is in a bag 510 is identified, the electronic device 110 may determine a small change in the level of an audio signal as the occurrence f hand covering, even though a level change of the audio signal, smaller than a level change of an audio signal having no occurrence of hand covering in the state in which the electronic device 110 is located in an open space, occurs in considering of a environment where some signal distortion have already occurred.

According to the above-described embodiments, the electronic device 110 may detect hand covering and may perform the corresponding control operation. Here, according to one embodiment, the electronic device 110 may include a plurality of microphone elements. In this case, the electronic device 110 may output the sound of the audio signal using at least one of a plurality of speaker elements, and may acquire the audio signal using at least one of the plurality of microphone elements. At this time, the electronic device 110 may identify the microphone element that is covered by a hand based on the audio signals obtained through the plurality of microphone elements, and may perform a control operation corresponding to the identified microphone element. Hereinafter, referring to FIG. 6A, an embodiment using a plurality of microphone elements will be described.

Figure 6A:
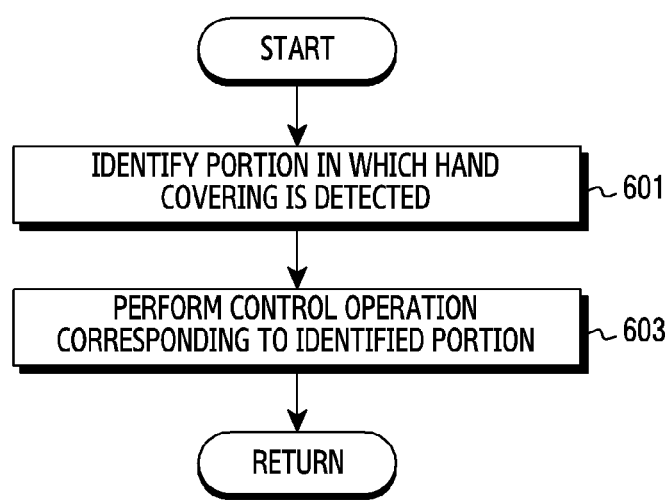
FIG. 6A illustrates a method for performing a control operation based on a location where hand covering is detected in an electronic device 100 including a plurality of microphones and speakers according to various embodiments of the disclosure.

FIG. 6A illustrates a method for performing a control operation based on a location where hand covering is detected in an electronic device 100 including a plurality of microphones and speakers according to various embodiments of the disclosure. The flowchart of FIG. 6A shows an example of the case where a control operation is performed differently depending on the microphone that is determined to be covered by a hand when the speaker 230 and the microphone 240 include a plurality of speaker elements and a plurality of microphone elements. The electronic device 110 may output the sound of the audio signal using at least one of the plurality of speaker elements, and may also acquire an audio signal using at least one of the plurality of microphone elements. The plurality of speaker elements and the plurality of microphone elements may be disposed in different portions of the electronic device 110.

In operation 601, the electronic device 110 may identify a portion where hand covering is detected. More specifically, the electronic device 110 may identify the microphone element or the speaker element through which hand covering is detected based on the audio signal output from the adjacent microphone element and the audio signal input to the speaker element.

According to various embodiments of the disclosure, it is possible to determine the microphone element through which an audio signal having a change of a level equal to or higher than a predetermined level, among the plurality of microphone elements, is input to be the microphone element that is covered by a hand.

In addition, according to various embodiments of the disclosure, each speaker element may be correlated with each of the microphone elements disposed adjacent thereto. The electronic device 110 may determine the microphone element through which an audio signal having a change of a level equal to or higher than a predetermined level is input among the audio signals input through the plurality of microphone elements, and may determine the speaker element adjacent to the corresponding microphone element to be the speaker element that is covered by a hand. In addition, the electronic device 110 may identify a position where hand covering occurs based on the audio signals input through the plurality of microphone elements. The position where hand covering occurs may be determined to be a portion in which the speaker element adjacent to the microphone element through which the audio signal having a change of a level equal to or higher than a predetermined level is input is located.

In operation 603, the electronic device 110 may perform a control operation corresponding to a portion that is determined to be covered by a hand. According to various embodiments of the disclosure, the electronic device 110 may perform a different control operation depending on the position of the speaker that is determined to be covered by a hand. For example, when hand covering is detected at the first speaker element while a ring tone of a call received at the electronic device is output, the volume of the ring tone may be reduced. When hand covering is detected at the second speaker element, the incoming call may be disconnected. By performing a different control operation based on the position where ha is detected, it is possible to realize more various control operations using the analysis of the audio signal.

Figure 6B:
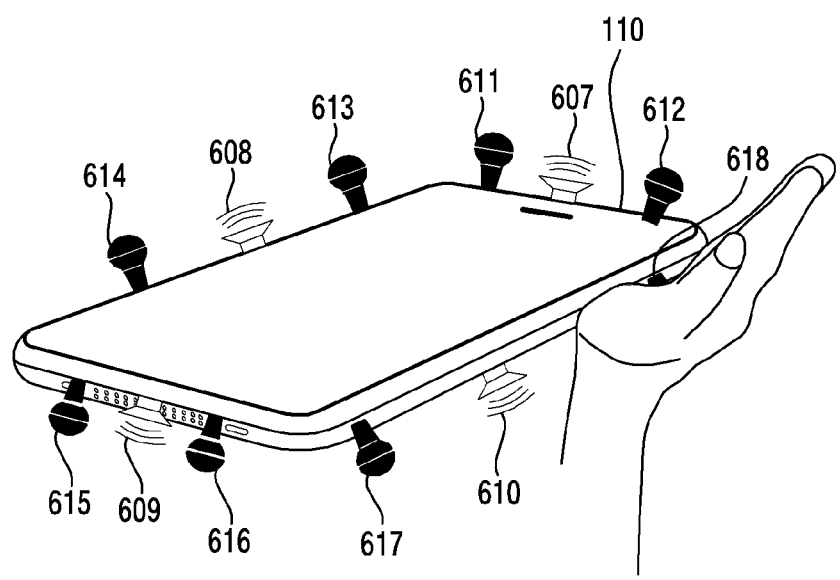
FIG. 6B illustrates an example of a case in which hand covering occurs in an electronic device including a plurality of microphones and speakers according to various embodiments of the disclosure.

FIG. 6B illustrates an example of the case in which hand covering occurs in an electronic device including a plurality of microphones and speakers according to various embodiments of the disclosure. Referring to FIG. 6B, the electronic device 110 may include a plurality of speaker elements 607, 608, 609, and 610 and a plurality of microphone elements 611, 612, 613, 614, 615, 616, 617, and 618. According to FIG. 6B, two microphone elements and one speaker element may be positioned on each side of the electronic device 110. For example, the speaker element 607 and the microphone elements 611 and 612 may be disposed on the upper side surface of the electronic device 110, and the speaker element 608 and the microphone elements 613 and 614 may be disposed on the right side surface of the electronic device 110. The speaker element 609 and the microphone elements 615 and 616 may be disposed on the lower side surface of the electronic device 110, and the speaker element 610 and the microphone elements 617 and 618 may be disposed on the left side surface of the electronic device 110.

In FIG. 6B, when the microphone element 618 is covered by a hand, an audio signal having a change in level equal to or higher than a predetermined level may be input via the microphone element 618, and the electronic device 110 may determine the microphone element 618 to be the microphone element that is covered by a hand. In addition, the electronic device 110 may perform a control operation corresponding to the microphone element 618 that is covered by a hand. For example, if hand covering is detected at the microphone element 618 while a ring tone for a call received at the electronic device 110 is being output, at least one of a plurality of control functions associated with the incoming call (e.g. terminating a ring tone output) may be performed.

Figure 7A:
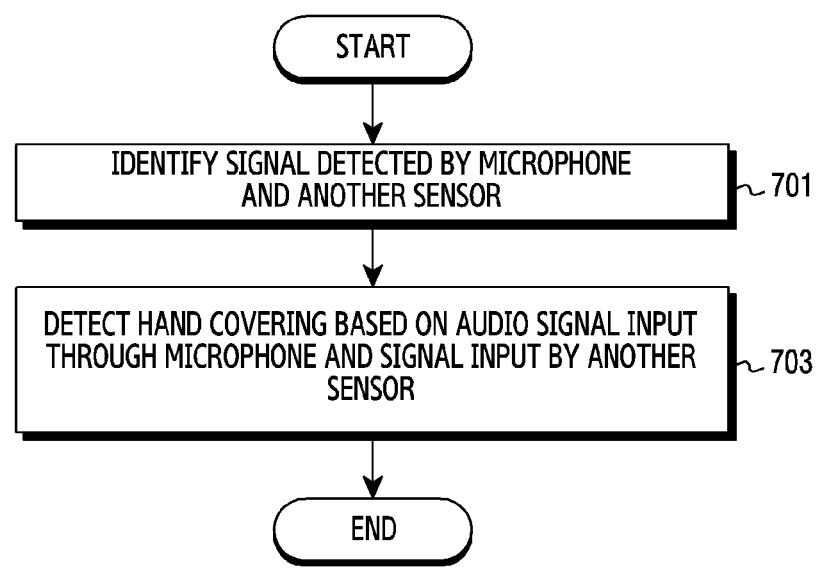
FIG. 7A illustrates a method for detecting hand covering based on an audio signal and a signal input by another sensor in an electronic device according to various embodiments of the disclosure.

FIG. 7A illustrates a method for detecting hand covering based on an audio signal and a signal input by another sensor in an electronic device according to various embodiments of the disclosure. The example of FIG. 7A is an example for detecting hand covering based on the audio signal as well as a signal obtained by another sensor (e.g., sensor 260). The flowchart of FIG. 7A may be an example of operation 303 of FIG. 3A.

In operation 701, the electronic device 110 may identify the signal detected by another sensor 260, rather than by the microphone 240. For example, the electronic device 110 may detect the movement of the electronic device using a signal generated using an acceleration sensor or a gyro sensor included in the sensor 260. Further, the electronic device 110 may confirm that the electronic device 110 is being gripped using the grip sensor included in the sensor 260.

The electronic device 110 may detect hand covering in consideration of the movement of the electronic device identified through the sensor 260 as well as the audio signal input via the microphone 240. In addition, the electronic device 110 may detect hand covering based on information about the gripping of the electronic device identified via the sensor 260 as well as the audio signal received via the microphone 240. By using the information identified through the other sensor as well as the audio signal, it is possible to improve the accuracy of hand-covering detection of the electronic device 110.

Figure 7B:
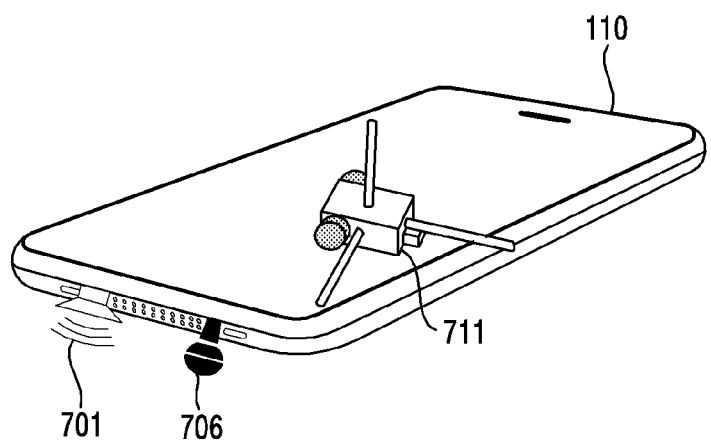
FIG. 7B illustrates an example of a sensor for detecting hand covering in an electronic device according to various embodiments of the disclosure.

FIG. 7B illustrates an example of a sensor for detecting hand covering in an electronic device according to various embodiments of the disclosure. Referring to FIG. 7B, the electronic device 110 may obtain information about the rotation of the electronic device via the gyro sensor included in the sensor 260. More specifically, the electronic device 110 may use the gyro sensor to identify the amount of rotation or the rotation speed of the electronic device for each of the x-, y-, and z-axes. According to various embodiments of the disclosure, the electronic device 110 may detect hand covering based on the information about the movement of the electronic device 110 as well as the audio signal input via the microphone 240. For example, even if the change in the audio signal input via the microphone 240 is smaller than a reference value, it may be determined that hand covering is detected when the electronic device 110 rotates.

Figure 8:
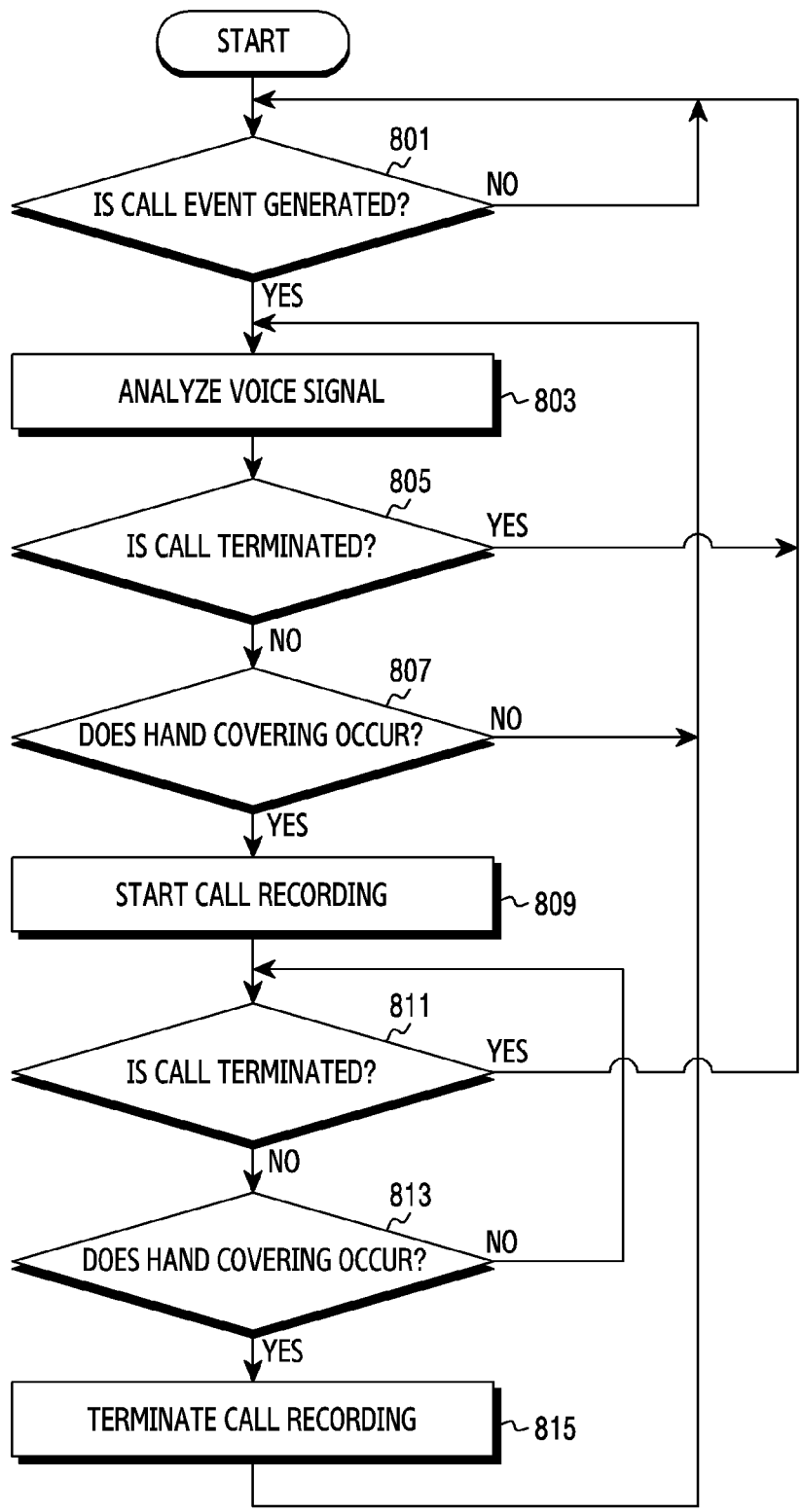
FIG. 8 illustrates a method for performing recording during a call based on hand covering in an electronic device according to various embodiments of the disclosure.

FIG. 8 illustrates a method for performing recording during a call based on hand covering in an electronic device according to various embodiments of the disclosure. The flowchart of FIG. 8 shows an example of a case where call recording is performed as a control operation in accordance with the detection of hand covering. The example of FIG. 8 illustrates a process for controlling a recording operation in response to the detection of hand covering during a call, but various embodiments of the disclosure may include another control operation as well as recording during a call.

In operation 801, the electronic device 110 may determine whether a call event occurs. The call event may include a voice call, a voice chat, or a video call. The electronic device 110 may determine whether an incoming or an outgoing call is currently underway.

In operation 803, the electronic device 110 may analyze a voice signal received via the microphone 240. The electronic device 110 may analyze a waveform of the voice signal input via the microphone 240 or a frequency band thereof. The electronic device 110 may use the hand-covering event data 251 stored in the memory 250 for analysis of the voice signal.

In operation 805, the electronic device 110 may determine whether an ongoing call is terminated. If the call is terminated without separate input, the electronic device 110 may return to operation 801 to monitor whether a call event occurs. If the call continues rather than being terminated, the electronic device 110 may proceed to operation 807 and may determine whether hand covering is detected.

In operation 807, the electronic device 110 may determine whether hand covering is detected. More specifically, the electronic device 110 may detect hand covering by analyzing the voice signal input via the microphone 240. For example, when the electronic device 110 detects that the voice signal input via the microphone 240 is distorted beyond a predetermined level for a predetermined time, it is determined that hand covering occurs. If hand covering does not occur, the electronic device 110 may return to operation 803 and may continue to analyze the voice signal input during the call.

If hand covering is detected, the electronic device 110 may proceed to operation 809 to start recording the call. In operation 809, the electronic device 110 may record the call from the time when hand covering is detected. The call may be recorded from the time when hand covering occurs until the end of the call or when another hand-covering event is detected.

The electronic device 110 that has performed the recording in response to the detection of the hand covering may proceed to operation 811 and determine whether the call is terminated. When the call is terminated, the electronic device 110 may also terminate the recording function and return to operation 801 to monitor whether a call event occurs. If the call is not terminated, the electronic device 110 may proceed to operation 813 while continuing to record the call.

In operation 813, the electronic device 110 may determine whether hand covering is detected. As in operation 807, the electronic device 110 may detect hand covering using the analysis of the voice signal input via the microphone 240. For example, when the electronic device 110 detects that the voice signal input via the microphone 240 is distorted beyond a predetermined level for a predetermined time, it may be determined that hand covering occurs.

If hand covering is detected in operation 813, the electronic device 110 may proceed to operation 815 to terminate the recording of the call. In operation 815, the electronic device 110 may terminate the recording of the call and may return to operation 811 to identify whether the call is terminated.

If hand covering is not detected in operation 813, the electronic device 110 may record the call while the call continues.

Figure 9A:
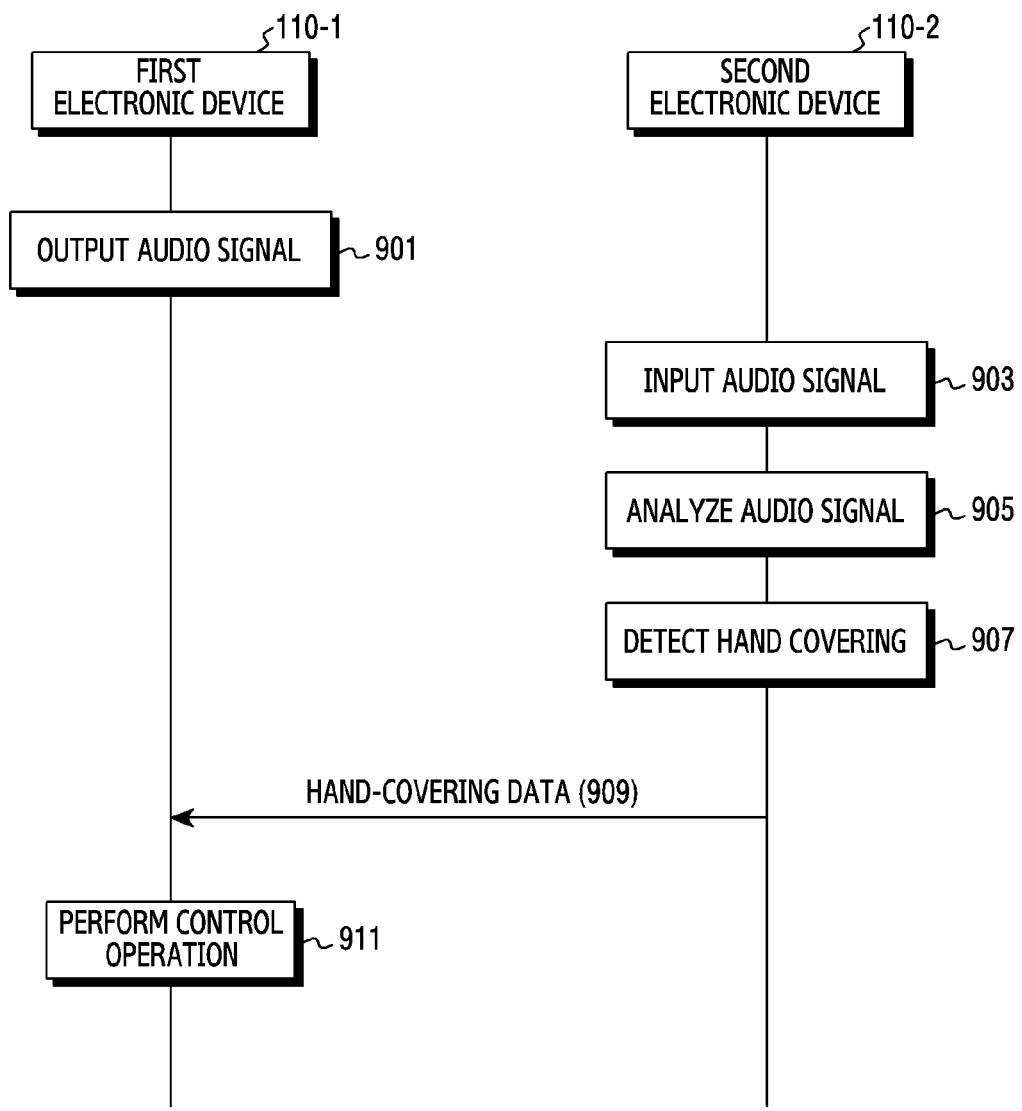
FIG. 9A illustrates an example of a signal flow for detecting hand covering using communication between a plurality of electronic devices in an electronic device according to various embodiments of the disclosure.

FIG. 9A illustrates an example of signal flow for detecting hand covering using communication between a plurality of electronic devices in an electronic device according to various embodiments of the disclosure. FIG. 9A shows an example in which output of the sound of the audio signal and input of the audio signal are respectively performed by different devices. FIG. 9A shows a signaling procedure between a first electronic device 110-1 and a second electronic device 110-2 to detect hand covering occurring in the first electronic device 110-1 or the second electronic device 110-2. FIG. 9A shows a process of detecting hand covering using signaling between the first electronic device 110-1 and the second electronic device 110-2, but an additional electronic device may participate in the process of detecting hand covering.

In operation 901, the first electronic device 110-1 may output the sound of the audio signal. The first electronic device 110-1 may output the sound of the audio signal through a speaker (e.g., the speaker 230 of FIG. 2) included or coupled to the first electronic device 110-1. The sound of the audio signal output from the first electronic device 110-1 may be a general audio signal or an audio signal for hand-covering detection shared with other electronic devices (e.g., the second electronic device 110-2).

In operation 903, the second electronic device 110-2 may receive the audio signal through a microphone (e.g., the microphone 240 in FIG. 2). More specifically, the second electronic device 110-2 may receive the audio signal including the sound of the audio signal output by the first electronic device 110-1. The audio signal input by the second electronic device 110-2 may receive an audio signal including other audio or noise together with the audio signal output by the first electronic device 110-1.

In operation 905, the second electronic device 110-2 may analyze the input audio signal. For example, the second electronic device 110-2 may compare the audio signal input to the second electronic device 110-2 with the audio signal of the sound output by the first electronic device 110-1. Here, the audio signal of the sound output by the first electronic device 110-1 may be an audio signal predefined by the first electronic device 110-1 and the second electronic device 110-2. In addition, information about the audio signal of the sound output by the first electronic device 110-1 may also be transmitted from the first electronic device 110-1 to the second electronic device 110-2. Also, the second electronic device 110-2 may separate or filter components corresponding to the audio signal of the sound output by the first electronic device 110-1 from the input audio signal.

In operation 907, the second electronic device 110-2 may detect hand covering. The second electronic device 110-2 may detect hand covering based on the input audio signal. According to various embodiments of the disclosure, the second electronic device 110-2 may detect hand covering based on the comparison between the audio signal input to the second electronic device 110-2 and the audio signal of the sound output by the first electronic device 110-1. For example, the second electronic device 110-2 may detect the occurrence of signal distortion of a predetermined level or more to be hand covering, compared to the audio signal of the sound output by the first electronic device 110-2.

Also, according to various embodiments of the disclosure, the second electronic device 110-2 may detect hand covering of the first electronic device 110-1 or the second electronic device 110-2 based on the input audio signal. For example, when signal distortion of a predetermined level or more occurs with respect to all input audio signals, the second electronic device 110-2 may confirm that hand covering of the second electronic device 110-2 has occurred. When distortion occurs only in a component corresponding to the audio signal of the sound output by the first electronic device 110-1 among the audio signals input to the second electronic device 110-2, the second electronic device 110-2 may confirm that hand covering of the first electronic device 110-1 has occurred. The second electronic device 110-2 may also detect hand covering based on a change in the component corresponding to the audio signal of the sound output by the first electronic device 110-1 among the audio signals input to the second electronic device 110-2. For example, when a sudden change occurs in the component corresponding to the output audio signal of the sound output by the first electronic device 110-1 among the audio signals input to the second electronic device 110-2, the second electronic device 110-2 may determine that hand covering of the first electronic device 110-1 has occurred.

In operation 909, the second electronic device 110-2 may transmit data on the detected hand covering to the first electronic device 110-1. For example, the second electronic device 110-2 may transmit information for informing the first electronic device 110-1 of the occurrence of hand covering. Also, the second electronic device 110-2 may transmit information about the audio signal input to the first electronic device 110-1. In addition, the second electronic device 110-2 may transmit, to the first electronic device 110-1, information about hand covering applied to the first electronic device 110-1 or hand covering applied to the second electronic device 110-1.

In operation 911, the first electronic device 110-1 may perform a control operation. More specifically, the first electronic device 110-1 may perform the control operation based on data received from the second electronic device 110-2. For example, the first electronic device 110-1 may perform a control operation corresponding to the occurrence of hand covering received from the second electronic device 110-2. For example, when receiving information indicating the occurrence of hand covering from the second electronic device, the first electronic device 110-1 may reduce the volume of the sound output by the first electronic device 110-1. In addition, the first electronic device 110-1 may perform a different control operation depending on the object covered by the hand. For example, when a hand covers a portion of the first electronic device 110-1, the first electronic device 110-1 may change the type of the output sound (e.g., an audio track), and when a hand covers a portion of the second electronic device 110-1, the first electronic device 110-1 may stop the output of the sound.

Figure 9B:
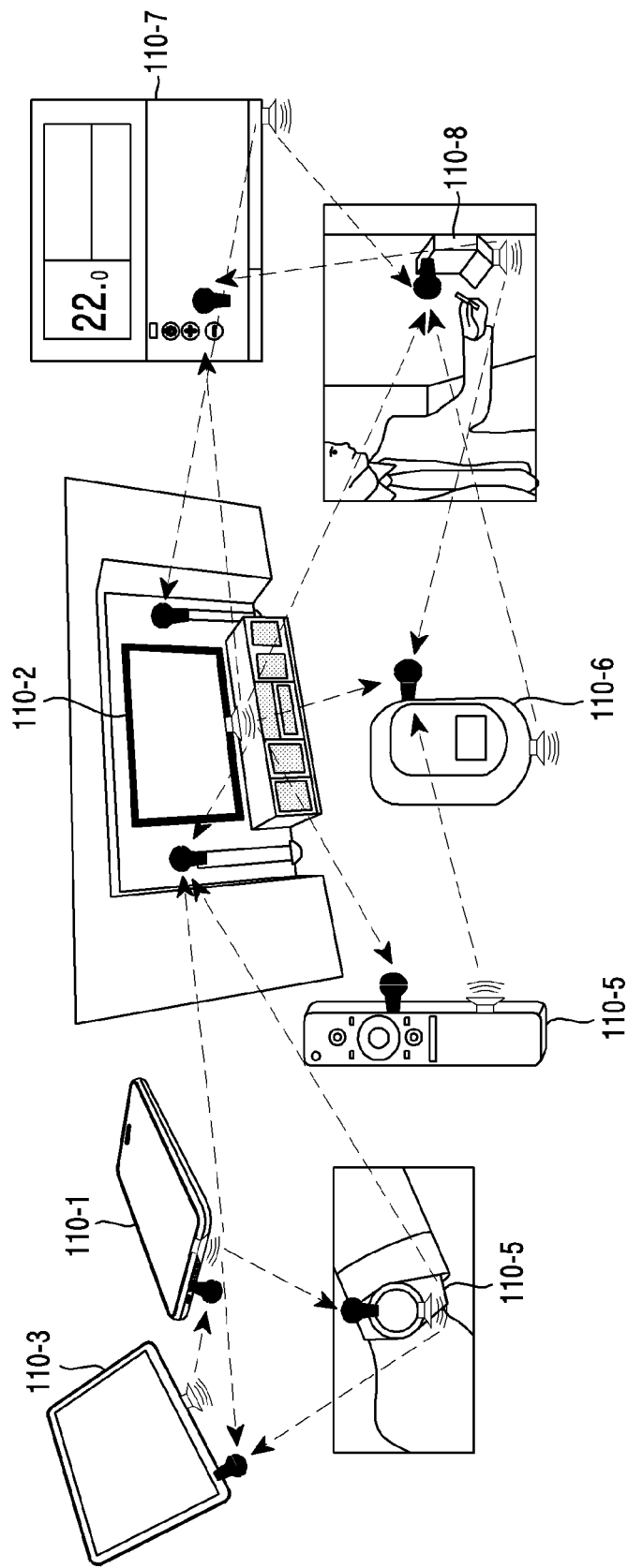
FIG. 9B illustrates an example of hand-covering detection using communication between a plurality of electronic devices in an electronic device according to various embodiments of the disclosure.

FIG. 9B illustrates an example of hand-covering detection using communication between a plurality of electronic devices in an electronic device according to various embodiments of the disclosure. Referring to FIG. 9B, hand covering may be detected using interlocking between the electronic devices 110-1 to 110-8. As shown in FIG. 9B, the audio signal of the sound output by the first electronic device 110-1 (e.g., a smartphone) may be input to the second electronic device 110-2 (e.g., a home theater), the third electronic device 110-3 (e.g., a tablet computer), or the fourth electronic device 110-4 (e.g., a wearable device). In addition, the audio signal of the sound output by the second electronic device 110-2 may be input to the fifth electronic device 110-5 (e.g., a remote controller), the sixth electronic device 110-6 (e.g., a videophone), the seventh electronic device 110-7 (e.g., a temperature controller), or the eighth electronic device 110-7 (e.g., a card reader). In addition, the respective devices may be interlocked to detect hand covering using the audio signal. Each of the electronic devices receiving the audio signal may detect hand covering based on the input audio signal. The electronic devices 110-1 to 110-7 may be connected via wireless or wired communication to exchange information about the audio signal or information about hand covering.

Figure 10A:
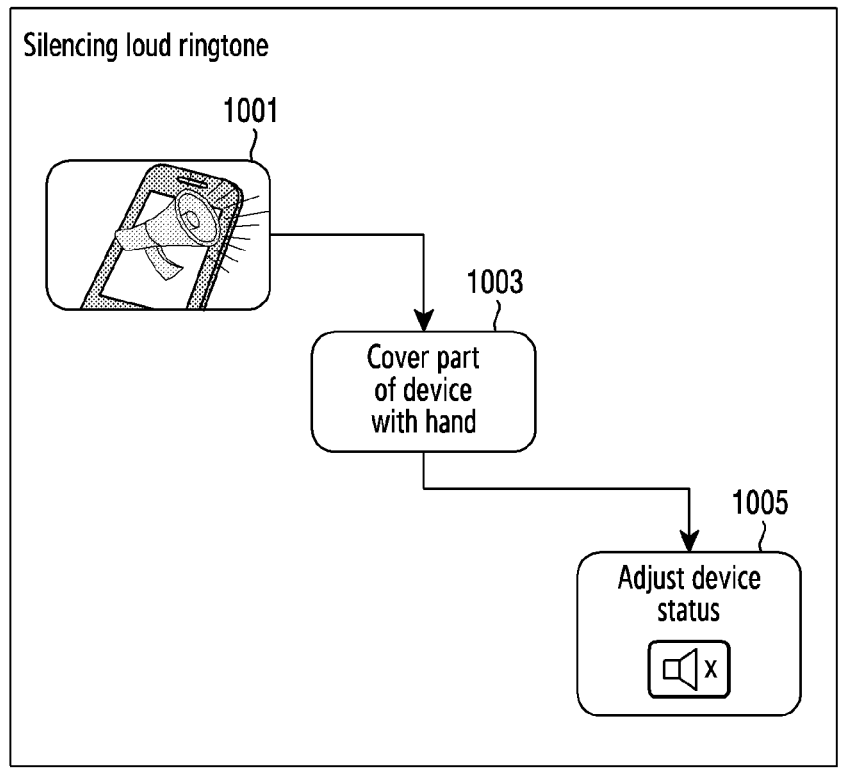
FIG. 10A illustrates an example of a procedure for controlling a ring tone in response to hand-covering detection in an electronic device according to various embodiments of the disclosure.

FIG. 10A illustrates an example of a procedure for controlling a ring tone in response to hand-covering detection in an electronic device according to various embodiments of the disclosure.

Referring to FIG. 10A, at block 1001, the electronic device 110 may output a ring tone. For example, the electronic device 110 may output a ring tone in response to reception of a call. The output of the ring tone may inconvenience a user when the user is watching a movie in a theater or is in a meeting.

At block 1003, the electronic device 110 may detect hand covering. For example, the electronic device 110 may detect hand covering based on a result of comparison between the audio signal output via the speaker 230 and the audio signal input via the microphone 240. In addition, the electronic device 110 may analyze the audio signal in consideration of the ambient environment of the electronic device 110.

At block 1005, the electronic device 110 may perform a control operation. For example, the electronic device 110 may reduce the volume of the ring tone output in response to the detection of hand covering, or may reject an incoming call. According to various embodiments of the disclosure, the electronic device 110 may perform other control operations depending on the number of times hand covering is detected. For example, when hand covering is detected once, the volume of the ring tone may be decreased. When hand covering is detected twice, the ring tone may be stopped. When hand covering is detected three times, the incoming call may be rejected.

Figure 10B:
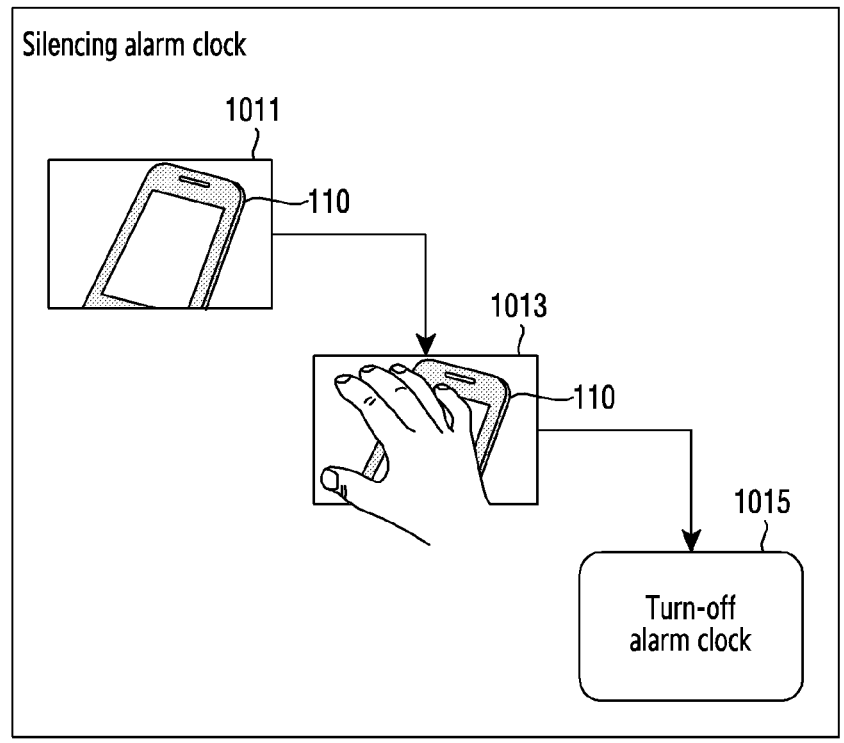
FIG. 10B illustrates an example of a procedure for controlling an alarm in response to hand-covering detection in an electronic device according to various embodiments of the disclosure.

FIG. 10B illustrates an example of a procedure for controlling an alarm in response to hand-covering detection in an electronic device according to various embodiments of the disclosure.

Referring to FIG. 10B, at block 1011, the electronic device 110 may output an alarm. For example, the electronic device 110 may output an alarm at a preset time according to a preset alarm setting. Since the volume of the alarm is generally set to a large value, a high-volume alarm may cause a user to feel uncomfortable due to the noise thereof.

At block 1003, the electronic device 110 may detect hand covering. For example, the electronic device 110 may detect hand covering based on a result of comparison between the audio signal output via the speaker 230 and the audio signal input via the microphone 240. In addition, the electronic device 110 may analyze the audio signal in consideration of the ambient environment of the electronic device 110.

At block 1005, the electronic device 110 may perform a control operation. For example, the electronic device 110 may reduce the volume of the alarm output in response to the detection of hand covering, or may terminate the output of the alarm. According to various embodiments of the disclosure, the electronic device 110 may perform other control operations depending on the number of times hand covering is detected. For example, if hand covering is detected once, the volume of the alarm may be reduced, if hand covering is detected twice, the alarm may be switched to a snoozing state, and if hand covering is detected three times, the alarm may be completely terminated.

Figure 11:
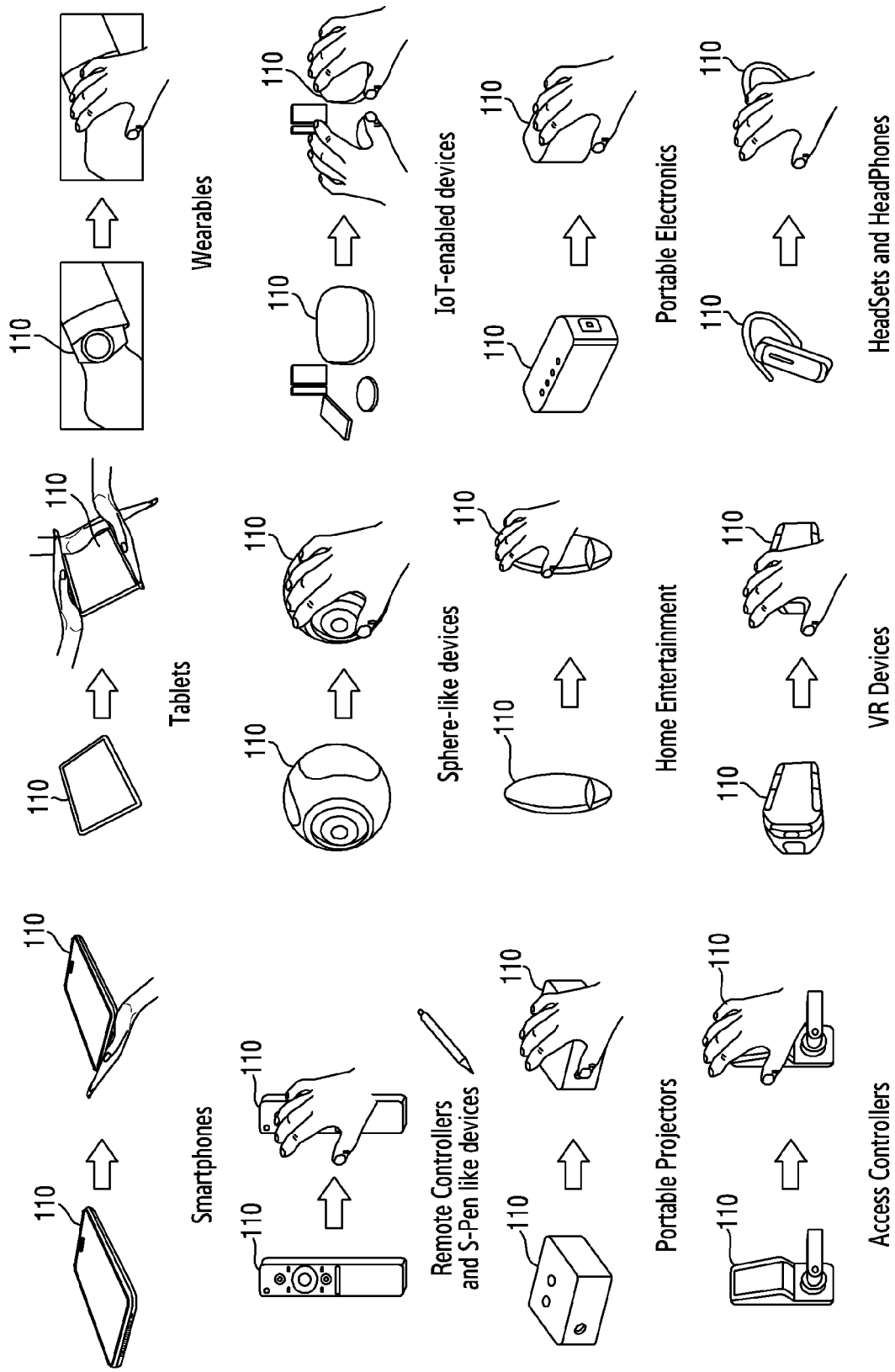
FIG. 11 illustrates examples of electronic devices for hand-covering detection according to various embodiments of the disclosure.

FIG. 11 illustrates examples of electronic devices for hand-covering detection according to various embodiments of the disclosure. Referring to FIG. 11, it can be seen that various embodiments of the disclosure can be applied to various types of electronic devices. For example, the electronic device according to various embodiments of the disclosure may include a smartphone, a tablet, a wearable device, a remote controller, an electronic pen (e.g., an S pen), a legacy device, an IoT-enabled device, a portable projector, a home entertainment device, a portable electronic device, an access controller, a virtual-reality (VR) device, a headset, or a pair of headphones. In addition to the devices shown in FIG. 11, the electronic device according to various embodiments of the disclosure may include at least one of a microphone, a speaker, or a sensor to enable interaction with a user. Various embodiments of the disclosure can be applied to the various electronic devices.

Figure 12A:
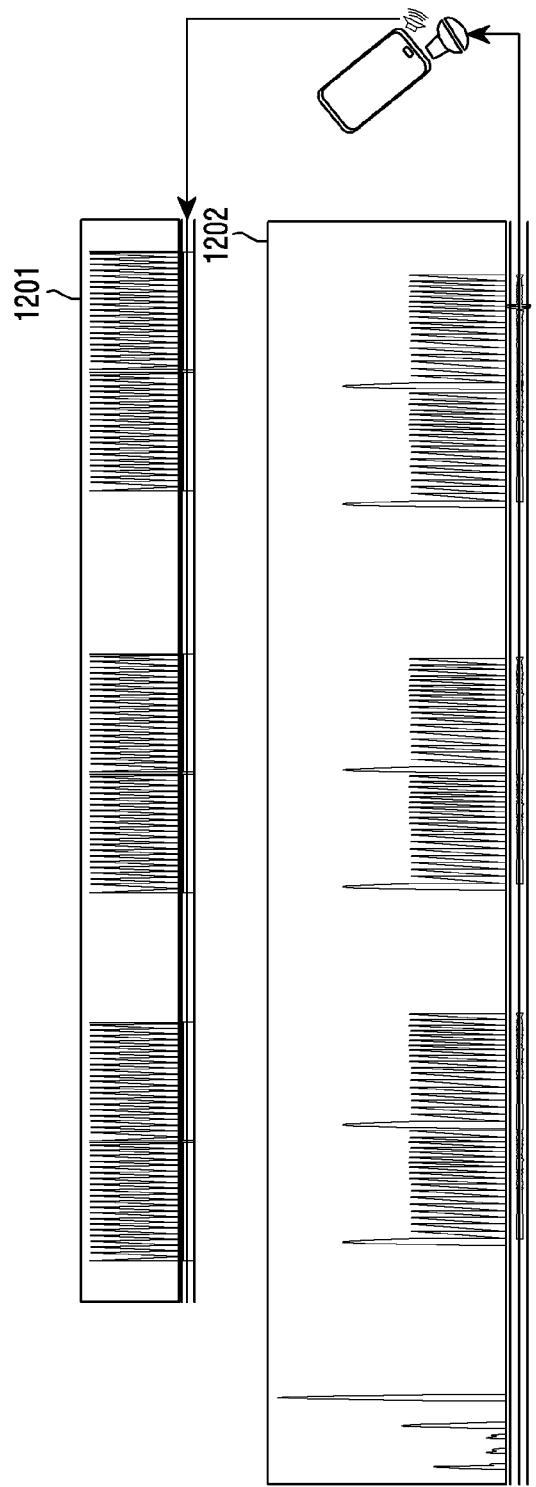
FIGS. 12A to 12C illustrate examples of an audio signal for detecting hand covering in an electronic device according to various embodiments of the disclosure.
Figure 12B:
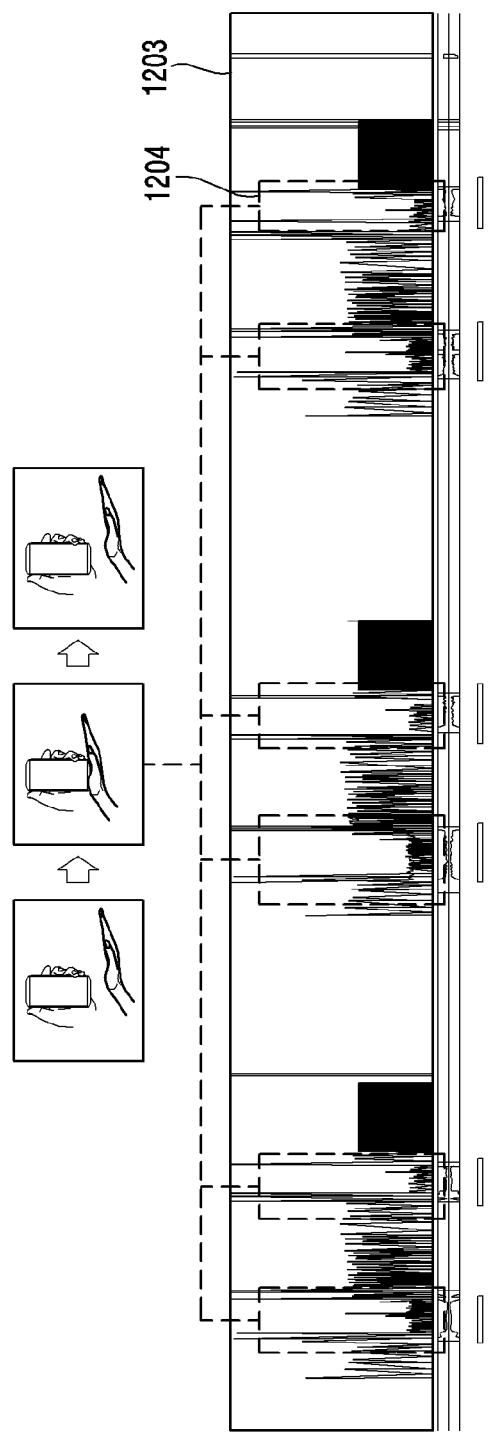
Figure 12C:
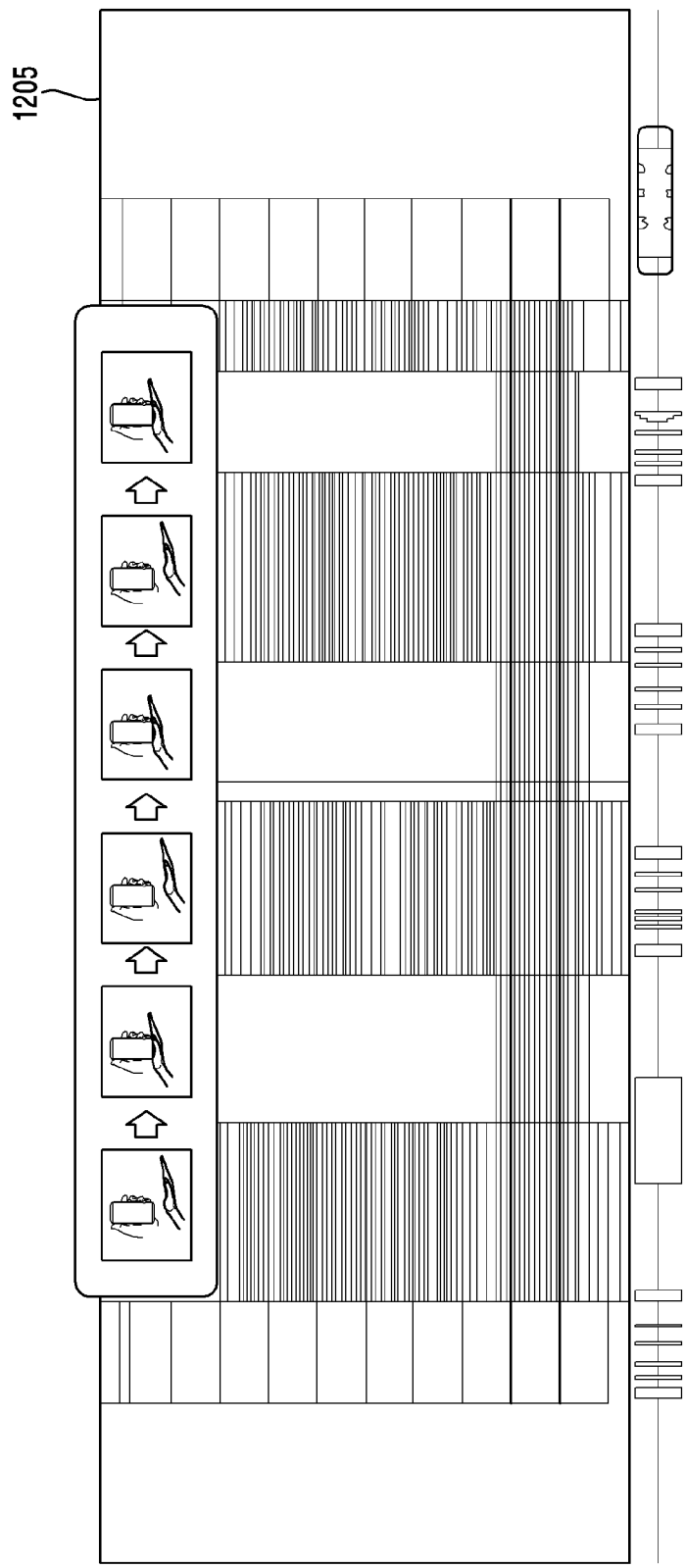

FIGS. 12A to 12C illustrate examples of an audio signal for detecting hand covering in an electronic device according to various embodiments of the disclosure.

FIG. 12A shows an example of an audio signal of the sound that is output via the speaker 230 in a general environment e.g., an environment in which an electronic device is placed on a table) and an audio signal that is input via the microphone 240. Referring to FIG. 12A, in a graph of the measured audio signal, the upper part corresponds to a spectrogram representing the frequency distribution of an audio signal, and the lower part corresponds to the waveform of an audio signal. In FIG. 12A, the audio signal input via the microphone 240 has substantially the same spectrogram as the audio signal of the sound output via the speaker 230, although there is a difference in the waveform.

FIGS. 12B and 12C show examples of audio signals input via the microphone 240 when hand covering occurs. Referring to FIG. 12B, it can be confirmed that the spectrogram and the waveform are changed when hand covering occurs, compared with the audio signal of the sound output via the speaker 230. The electronic device 110 may determine that hand covering is detected if a change in the spectrogram and waveform is detected. The electronic device 110 may store, in the memory 250, characteristics about the audio signal when hand covering occurs. The characteristics of the audio signal when hand covering occurs may be stored as the hand-covering event data 251 stored in the memory 250.

Figure 13A:
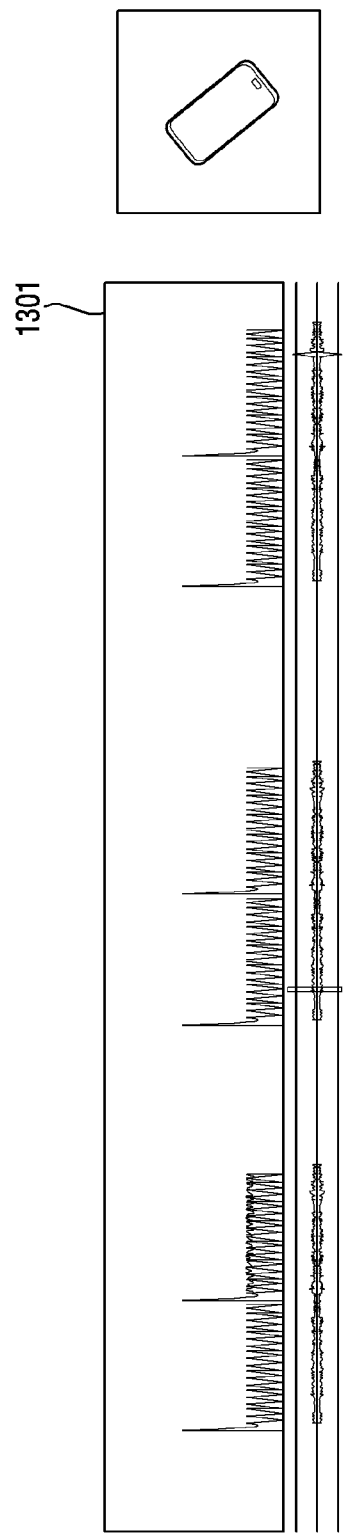
FIGS. 13A to 13F illustrate examples of an audio signal input according to an ambient environment in an electronic device according to various embodiments of the disclosure.
Figure 13B:
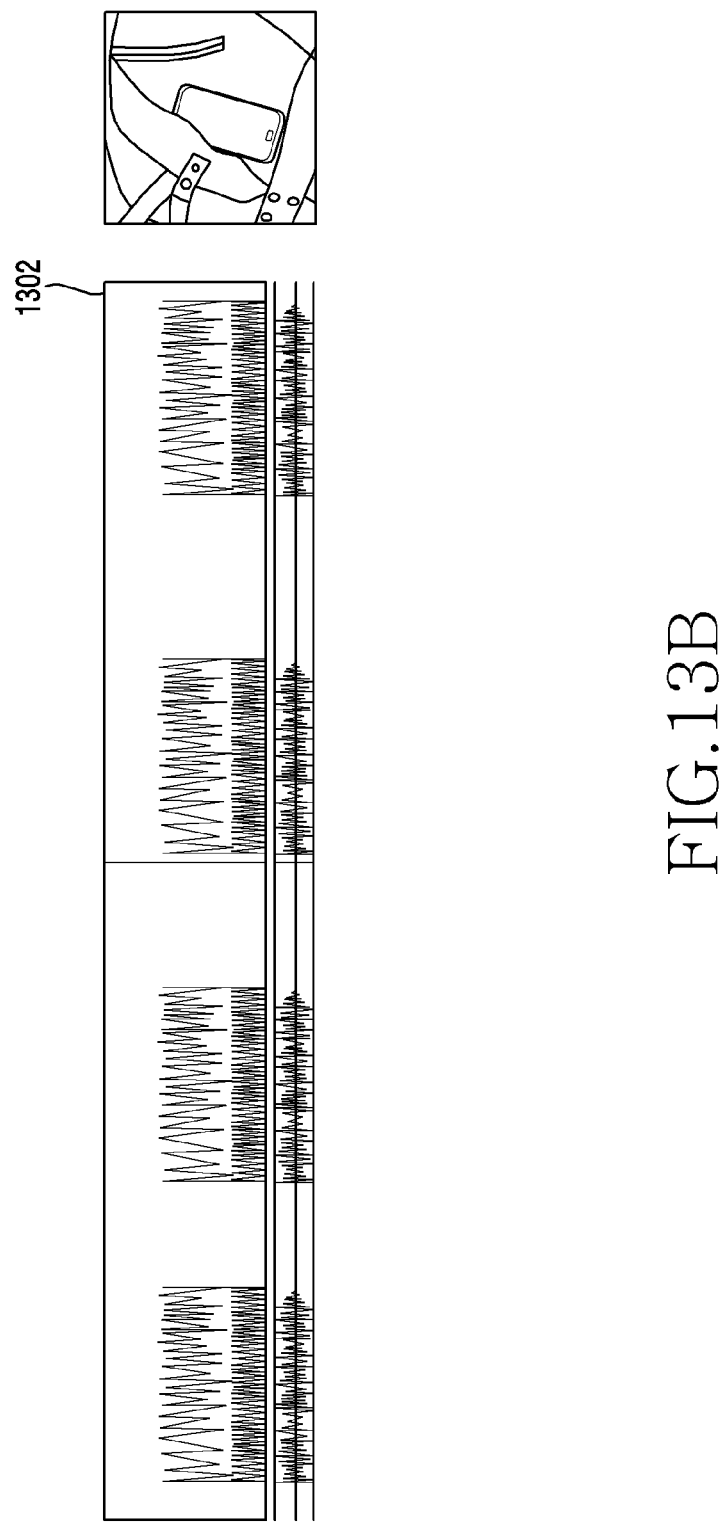
Figure 13C:
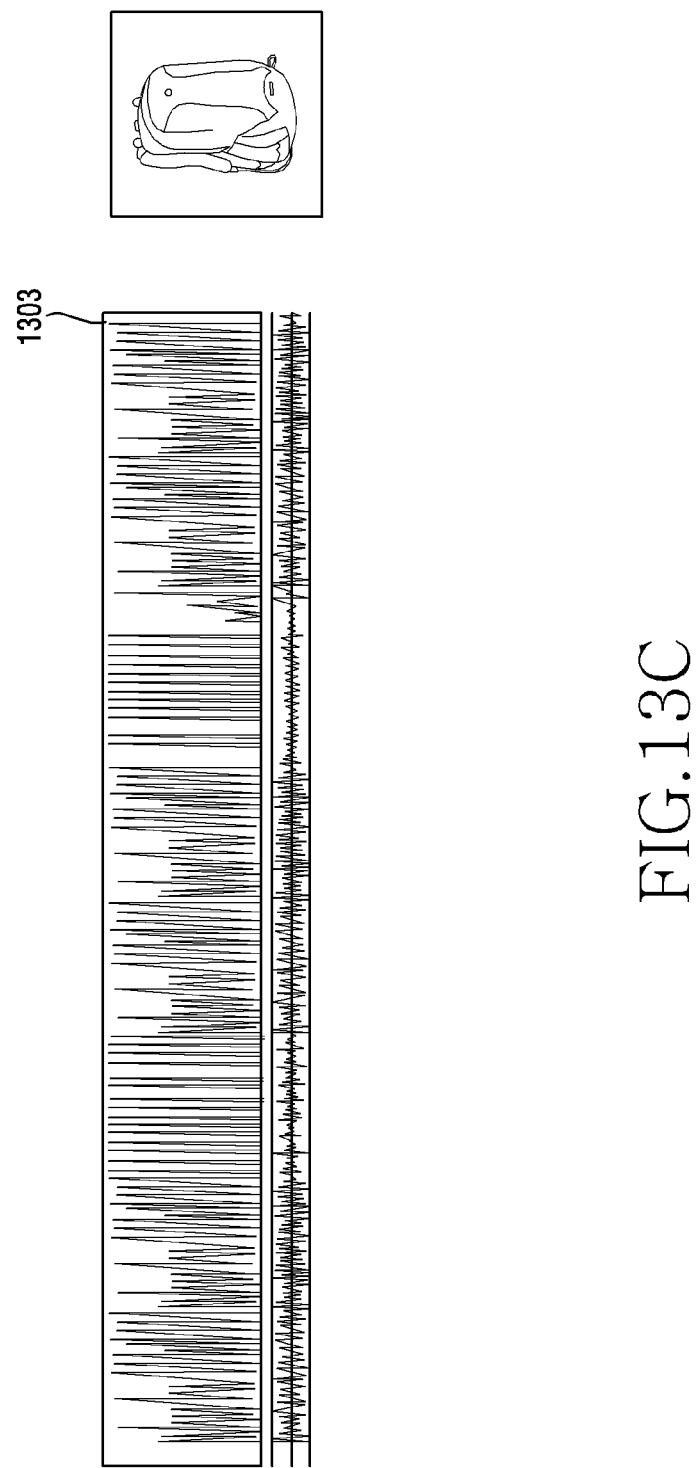
Figure 13D:
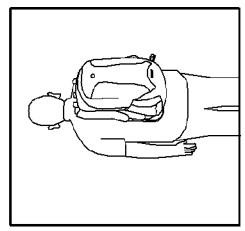
Figure 13D:
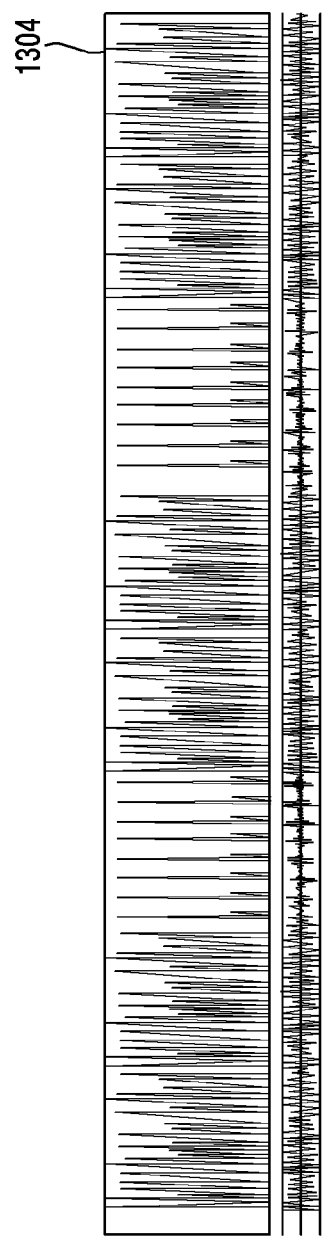
Figure 13E:
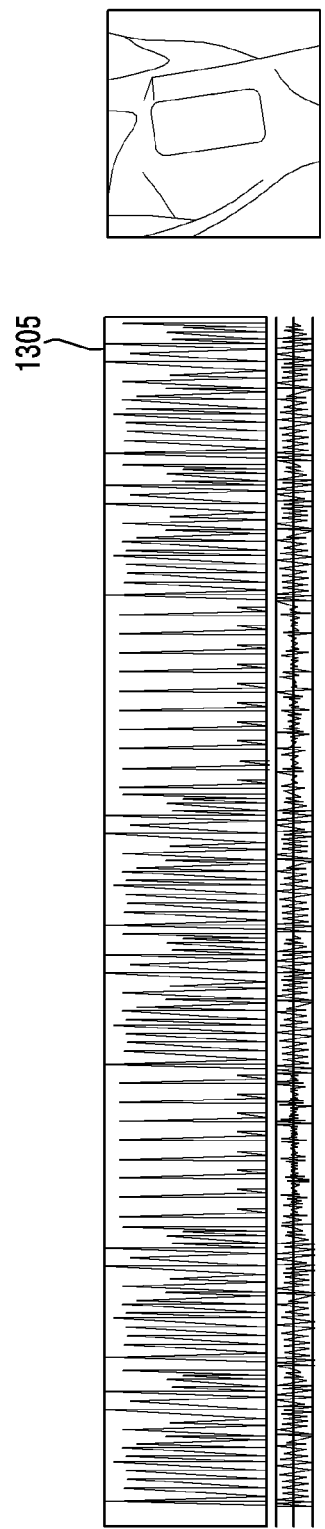
Figure 13F:
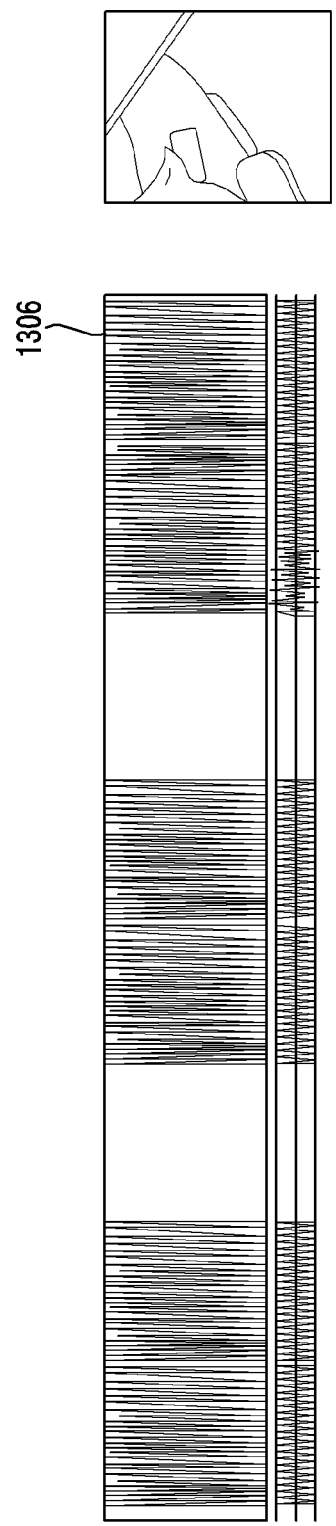

FIGS. 13A to 13F illustrate examples of an audio signal input according to an ambient environment in an electronic device according to various embodiments of the disclosure, FIG. 13A shows an example of the state in which the electronic device 110 is placed on a table, FIG. 13B shows an example of the state in which the electronic device 110 is in a bag and the bag is open, FIG. 13C shows an example of the state in which the electronic device 110 is in the bag and the bag is closed, FIG. 13D shows an example of the state in which the electronic device 110 is in a bag and a user carrying the bag is walking, FIG. 13E shows an example of the state in which the electronic device 110 is in a user's pocket and the user is moving, and FIG. 13F shows an example of the state in which the electronic device 110 is in the user's pocket and the user is stationary. As shown in FIGS. 13A to 13F, it can be seen that the audio signal input via the microphone 240 has different characteristics depending on the environment of the electronic device 110.

According to various embodiments of the disclosure, the electronic device 110 may consider the environment of the electronic device 110 in order to detect hand covering. The electronic device 110 may store information on the characteristics of the various environment-specific audio signals in the memory 250. The characteristics of the various environment-specific audio signals may be stored as hand-covering event data 251.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. An electronic device comprising:
   a plurality of speaker elements respectively positioned at different regions;
   a memory;
   a plurality of microphone elements respectively positioned at different regions; and
   at least one processor configured to be coupled to the plurality of speaker elements and the plurality of microphone elements,
   wherein the at least one processor is configured to:
      output sound via the plurality of speaker elements based on a first audio signal,
      acquire a second audio signal from the sound via the plurality of microphone elements,
      detect an input based on a comparison result between the first audio signal and the acquired second audio signal,
      determine a speaker element, of the plurality of speaker elements, in which the input is detected based on audio signals acquired through the plurality of microphone elements, and
      perform a control operation corresponding to the determined speaker element and the input.

2. The electronic device of claim 1, wherein the at least one processor is further configured to:
   detect an occurrence of a change of a predetermined level or higher with respect to the second audio signal; and
   determine the occurrence of the change of the predetermined level or higher to be the input, and
   wherein the change in the second audio signal includes at least one of a change in a waveform of the second audio signal, a change in a magnitude thereof, a change in energy thereof, and a change in signal strength for each frequency band thereof.

3. The electronic device of claim 1, further comprising:
   at least one sensor,
   wherein the at least one processor is configured to:
      detect movement of the electronic device through the at least one sensor; and
      output the sound via the plurality of speaker elements when the movement of the electronic device occurs.

4. The electronic device of claim 1, wherein the at least one processor is configured to:

identify information related to an ambient environment of the electronic device, determine a level for interpreting the second audio signal based on the information related to the ambient environment, and detect the input by interpreting the second audio signal based on the determined level.

5. The electronic device of claim 4, wherein the at least one processor is configured to determine occurrence of a change in the second audio signal larger than the determined level to be the detected input.

6. The electronic device of claim 4, wherein the information related to the ambient environment is identified based on a comparison between information on characteristics of audio signals of different ambient environments that are stored in the memory and the acquired second audio signal.

7. The electronic device of claim 1, wherein the at least one processor is configured to:

detect the input based on a change level of a voice signal input via the plurality of microphone elements during a call, and perform recording of the call based on the input.

8. The electronic device of claim 1, wherein the at least one processor is configured to:

identify a number of times that the input is generated, determine a type of the control operation based on the number of times that the input is generated, and perform the control operation based on the determined type.

9. The electronic device of claim 1, further comprising: a transceiver, wherein the at least one processor is configured to transmit information on the input to another electronic device through the transceiver when the input is detected.

10. A method for operating an electronic device, the method comprising:

outputting a sound based on a first audio signal;

acquiring a second audio signal from the sound;

detecting an input based on a comparison result between the first audio signal and the acquired second audio signal;

determining a speaker element, of a plurality of speaker elements, in which the input is generated based on audio signals acquired through a plurality of microphone elements; and performing a control operation corresponding to the determined speaker element and the input.

11. The method of claim 10, wherein detecting the input comprises:

detecting an occurrence of a change of a predetermined level or higher with respect to the second audio signal, and determining the occurrence of the change of the predetermined level or higher to be the input, wherein the change in the second audio signal includes at least one of a change in a waveform of the second audio signal, a change in a magnitude thereof, a change in an energy thereof, or a change in a signal strength for each frequency band thereof.

12. The method of claim 10, wherein outputting the sound based on the first audio signal comprises:

detecting movement of the electronic device, and outputting the sound through a speaker when the movement of the electronic device occurs.

13. The method of claim 10, wherein detecting the input comprises:

identifying information related to an ambient environment of the electronic device, determining a level for interpreting the second audio signal based on the information related to the ambient environment, and detecting the input by interpreting the second audio signal based on the determined level.

14. The method of claim 13, wherein detecting the input comprises determining an occurrence of a change in the second audio signal larger than the determined level to be the detected input.

15. The method of claim 13, wherein the information related to the ambient environment is identified based on a comparison between information on characteristics of audio signals of different ambient environments that are stored in a memory and the acquired second audio signal.

16. The method of claim 10, wherein detecting the input comprises:

detecting the input based on a change level of voice signal input during a call, and performing a record of the call in response to detecting the input during the call.

17. The method of claim 10, wherein detecting the input comprises:

identifying a number of times that the input is generated;

determining a type of the control operation based on the number of times that the input is generated; and performing the control operation based on the determined type.

18. The method of claim 10, wherein performing the control operation comprises:

according to the input, transmitting information on the input to another electronic device through a transceiver when the input is detected.

* * * * *